United States Patent
Ye et al.

(10) Patent No.: US 12,543,887 B2
(45) Date of Patent: Feb. 10, 2026

(54) MODULAR FOOD WARMING PAD

(71) Applicant: Guangdong Willing Technology Corporation, Guangdong (CN)

(72) Inventors: Jingnong Ye, Guangdong (CN); Shifa Luo, Guangdong (CN); Hong Liu, Guangdong (CN); Kunhuan Feng, Guangdong (CN)

(73) Assignee: Guangdong Willing Technology Corporation, Huizhou (CN)

( * ) Notice: Subject to any disclaimer, the term of this patent is extended or adjusted under 35 U.S.C. 154(b) by 0 days.

(21) Appl. No.: 19/084,792

(22) Filed: Mar. 20, 2025

(65) Prior Publication Data

US 2025/0213066 A1    Jul. 3, 2025

Related U.S. Application Data

(63) Continuation-in-part of application No. 18/646,924, filed on Apr. 26, 2024.

(30) Foreign Application Priority Data

Apr. 27, 2023 (CN) .......................... 202321013145.6
Oct. 10, 2024 (CN) .......................... 202422445860.8

(51) Int. Cl.
  *A47J 36/24*    (2006.01)
(52) U.S. Cl.
  CPC ............................... *A47J 36/2483* (2013.01)

(58) Field of Classification Search
  CPC .................................................. A47J 36/2483
  See application file for complete search history.

(56) References Cited

U.S. PATENT DOCUMENTS

| | | | | |
|---|---|---|---|---|
| 2,612,585 | A * | 9/1952 | Mccann | H05B 3/342 338/276 |
| 6,291,805 | B1 | 9/2001 | Simeray | |
| 8,106,336 | B2 | 1/2012 | Lawrence et al. | |
| 12,109,739 | B1 | 10/2024 | Chen | |
| 2010/0116818 | A1* | 5/2010 | Gabbay | H05B 6/36 219/528 |
| 2012/0168427 | A1* | 7/2012 | Chang | F24D 13/02 219/528 |
| 2023/0247728 | A1 | 8/2023 | Ye et al. | |

* cited by examiner

*Primary Examiner* — Edward F Landrum
*Assistant Examiner* — Kuangyue Chen
(74) *Attorney, Agent, or Firm* — S.J. INTELLECTUAL PROPERTY LTD.

(57) ABSTRACT

A modular food warming pad includes a first heating pad and a plurality of second heating pads. The first heating pad includes a first support panel, a controller and a first connector electrically connected to each other. Each second heating pad includes a second supporting panel, a second connector, and a third connector electrically connected to each other. The first heating pad and the second heating pads are arranged in a first direction. The first connector of the first heating pad is electrically connected to the second connector of an adjacent second heating pad; the third connector of one second heating pad is electrically connected to the second connector of its adjacent second heating pad.

16 Claims, 32 Drawing Sheets

MODULAR FOOD WARMING PAD

CROSS REFERENCE TO RELATED APPLICATIONS

This is a continuation-in-part of U.S. patent application Ser. No. 18/646,924 filed on Apr. 26, 2024, which claims priority of Chinese patent application CN 202321013145.6, filed on Apr. 27, 2023; and claims priority of Chinese patent application CN 2024224458608, filed on Oct. 10, 2024; the contents of which are incorporated herein by reference in their entirety.

TECHNICAL FIELD

The present disclosure relates to food warming devices, and in particular, to a modular food warming pad.

BACKGROUND

A food warming pad primarily functions to heat dishes placed on it, thereby preventing the food from cooling down during the meal. In the related art, food warming pads typically adopt a single-plate structure. However, when used in different scenarios or with varying quantities of dishes, this fixed single-plate design cannot adjust its heating area accordingly, failing to adapt to diverse usage requirements.

SUMMARY

A first aspect of the present disclosure provides a modular food warming pad. The modular food warming pad includes: a first heating pad, and a plurality of second heating pads electrically connected to each other. The first heating pad includes: a first support panel having an assembly end and a connection end, a first heating source and a first wire being provided on the first support panel; a controller connected to the assembly end, the first heating source and a first end of the first wire being electrically connected to the controller; and a first connector connected to the connection end, a second end of the first wire being electrically connected to the first connector. Each of the plurality of second heating pads includes: a second support panel arranged with a second heating source and a second wire; a second connector connected to the second support panel, a first end of the second connector being electrically connected to the second heating source and a first end of the second wire; and a third connector connected to the second support panel, a first end of the third connector being electrically connected to a second end of the second wire. The first heating pad and the plurality of second heating pads are arranged in a first direction; the first connector of the first heating pad is electrically connected the second connector of an adjacent second heating pad of the plurality of second heating pads; the third connector of one second heating pad of the plurality of second heating pads is electrically connected to the second connector of its adjacent second heating pad of the plurality of second heating pads.

A second aspect of the present disclosure provides a modular food warming pad. The modular food warming pad includes: a first heating pad, and a plurality of second heating pads electrically connected to each other. The first heating pad includes: a first support panel having an assembly end and a connection end, a first heating source and a first wire being provided on the first support panel; a controller connected to the assembly end, the first heating source and a first end of the first wire being electrically connected to the controller; and a first connector connected to the connection end, a second end of the first wire being electrically connected to the first connector. Each of the plurality of second heating pads includes: a second support panel arranged with a second heating source and a second wire; a second connector connected to the second support panel, a first end of the second connector being electrically connected to the second heating source and a first end of the second wire; and a third connector connected to the second support panel, a first end of the third connector being electrically connected to a second end of the second wire. The first connector of the first heating pad is electrically connected to the first end of the second connector of an adjacent second heating pad of the plurality of second heating pads in a second direction; two adjacent second heating pads of the plurality of second heating pads are electrically connected by means of the second ends of two corresponding second connectors in the second direction.

A third aspect of the present disclosure provides a modular food warming pad. The modular food warming pad includes: a plurality of second heating pads electrically connected to each other; and a controller detachably connected to one second heating pad of the plurality of second heating pads. Each of the plurality of second heating pads includes: a second support panel arranged with a second heating source and a second wire; a second connector connected to the second support panel, a first end of the second connector being electrically connected to the second heating source and a first end of the second wire; and a third connector connected to the second support panel, a first end of the third connector being electrically connected to a second end of the second wire. The controller is arranged with a control connector configured to be plugged into and electrically connected to a corresponding second connector, and the controller is configured to control the plurality of second heating pads.

BRIEF DESCRIPTION OF THE DRAWINGS

The drawings constituting a part of the present disclosure are intended to provide a further understanding of the present disclosure. The embodiments of the present disclosure and their descriptions are intended for explaining and do not constitute improper limitations on the present disclosure.

DETAILED WAY

Figure 1:
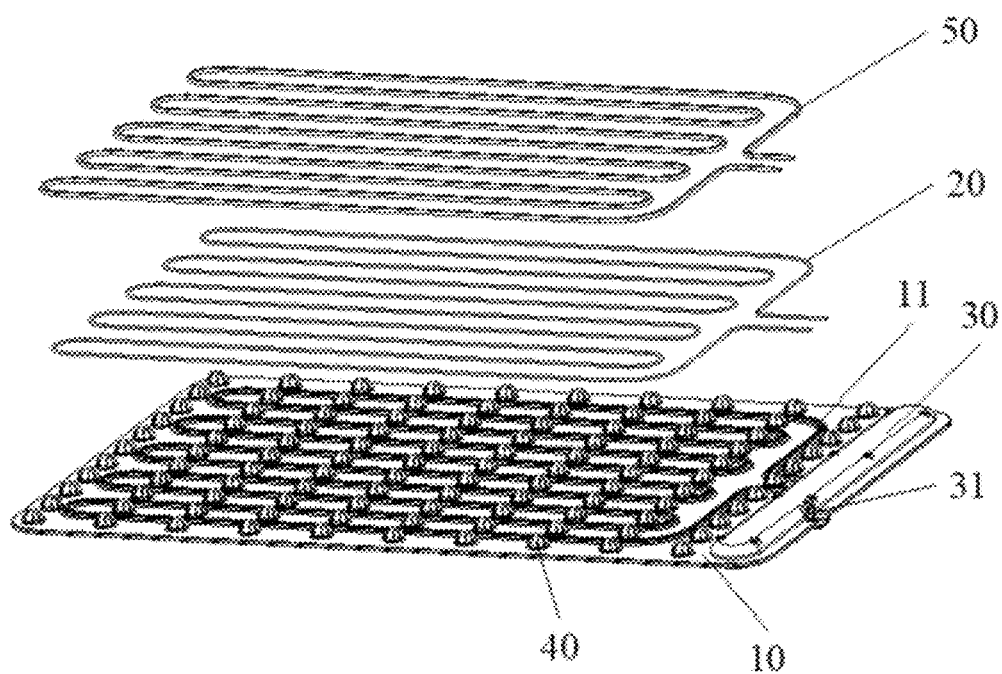
FIG. 1 is an exploded view of a food warming pad in accordance with the embodiments of the present disclosure.

The present disclosure may be described in detail below with reference to the accompanying drawings and in conjunction with various embodiments. Each example is provided to explain but not limit the present disclosure. In fact, it may be clear to those of ordinary skill that modifications and variations may be made without departing from the scope or spirit of the present disclosure. For example, a feature shown or described as part of some embodiments may be used according to some embodiments to produce yet some embodiments. Therefore, it is intended that the present disclosure includes such modifications and variations within the scope of the appended claims and their equivalents.

In the description of the present disclosure, the terms "longitudinal", "lateral", "upper", "lower", "front", "back", "left", "right", "vertical", "horizontal", "top", "bottom" and the like indicate the orientational or positional relationship based on the orientational or positional relationship illustrated in the drawings, which is only for the convenience of describing and eliminates the require the present disclosure to be constructed and operated in a specific orientation, and therefore cannot be understood as limiting the present disclosure. The terms "connected", "connecting" and "arranged" used in the present disclosure should be understood in a broad sense. For example, it may be a fixed connection or a detachable connection; it may be directly connected or indirectly connected through an intermediate component; it may also be a wired electrical junction, a radio connection, or a wireless signal connection. For those of ordinary skill in the art, the specific meanings of the above terms may be understood according to the specific circumstances.

One or more examples of the present disclosure are illustrated in the attached drawings. Numbers and letter signs are used in the detailed description to refer to features in the drawings. Similar signs in the drawings and descriptions have been configured to refer to similar parts of the present disclosure. As used herein, the terms "first", "second" and "third" are used interchangeably to distinguish one component from another and are not intended to indicate the position or importance of individual components.

Figure 2:
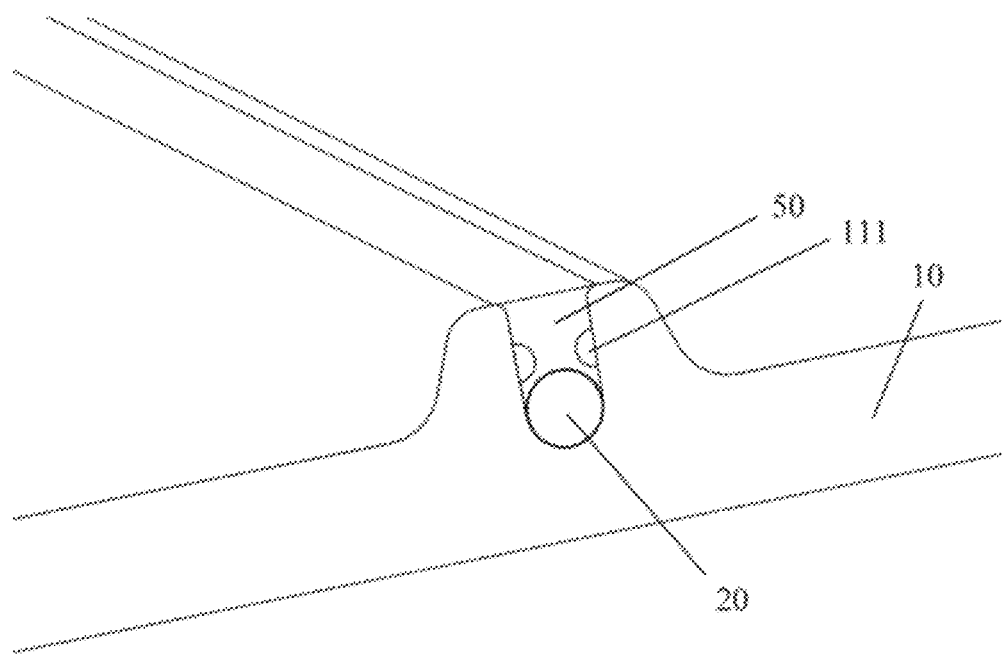
FIG. 2 is a sectional view of a food warming pad in accordance with the embodiments of the present disclosure.
Figure 3:
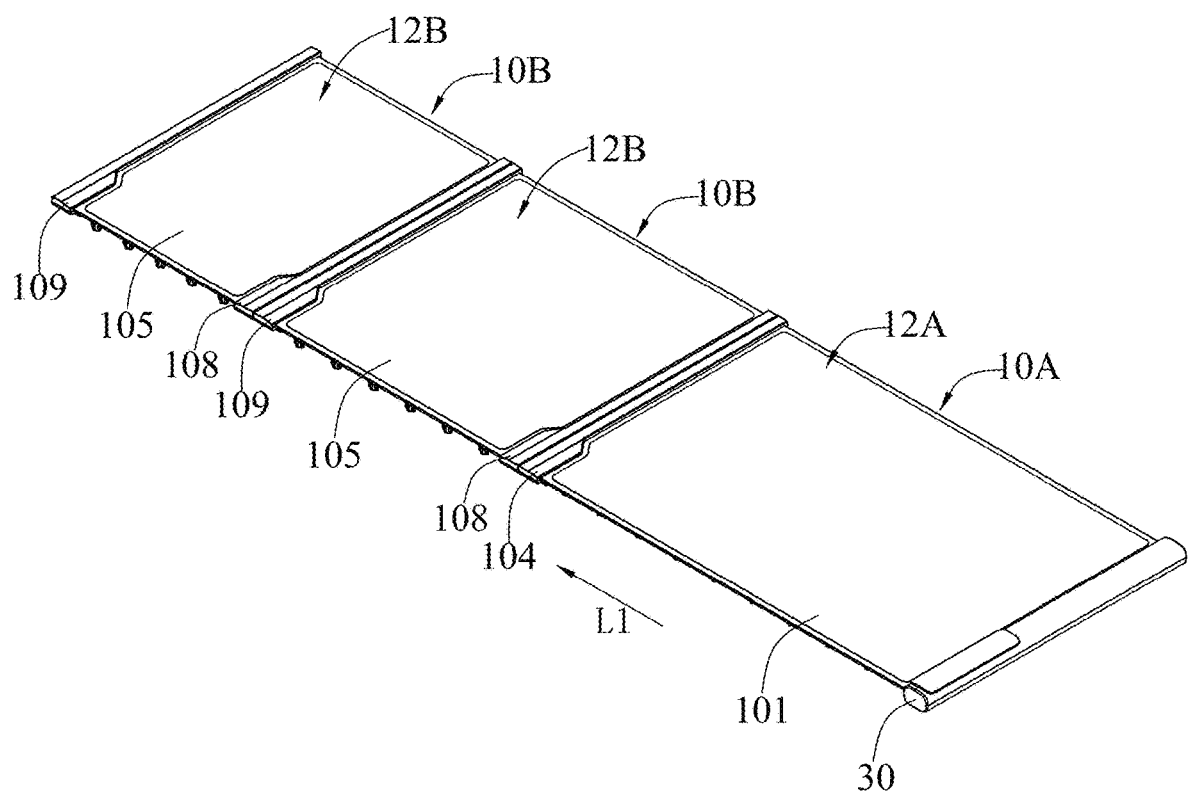
FIG. 3 is a perspective view of a first heating pad and a second heating pad being assembled along a first direction in accordance with the embodiments of the present disclosure.
Figure 4:
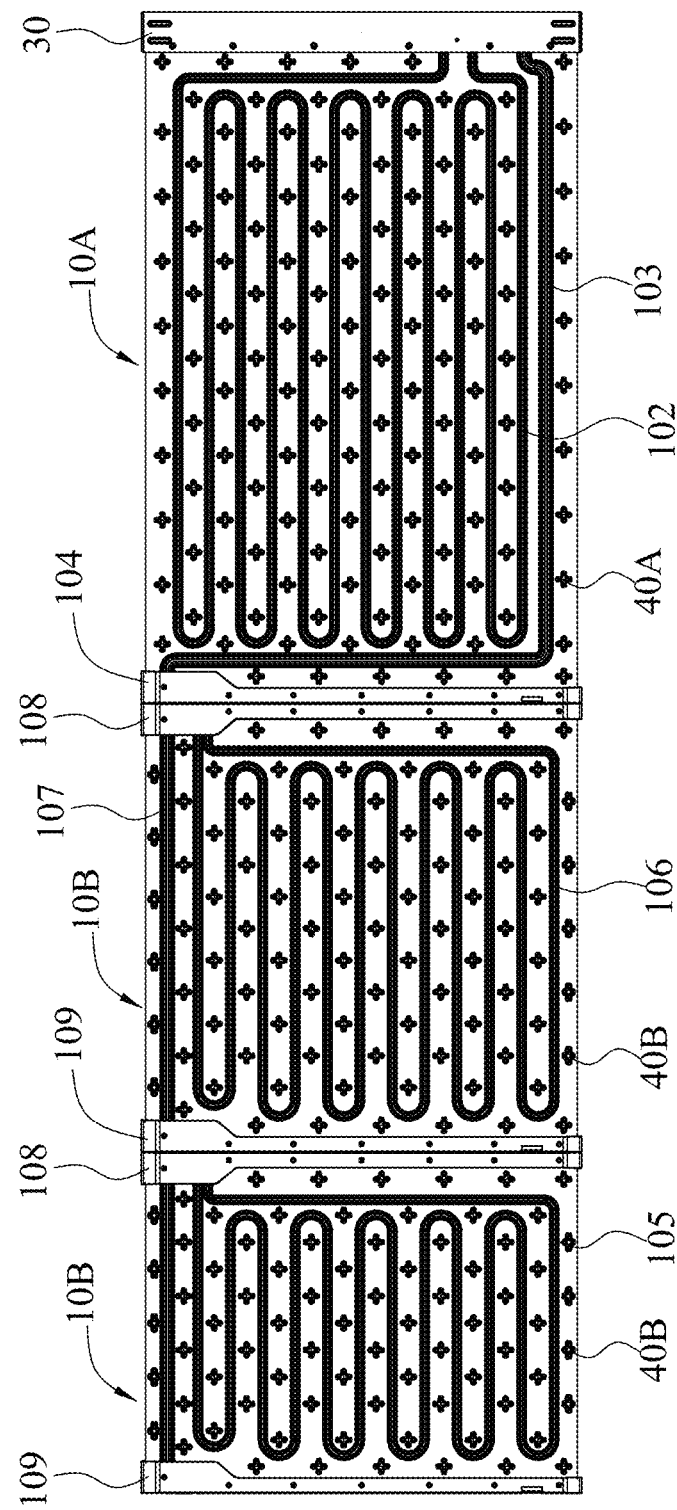
FIG. 4 is another perspective view of a first heating pad and a second heating pad being assembled along a first direction in accordance with the embodiments of the present disclosure.
Figure 5:
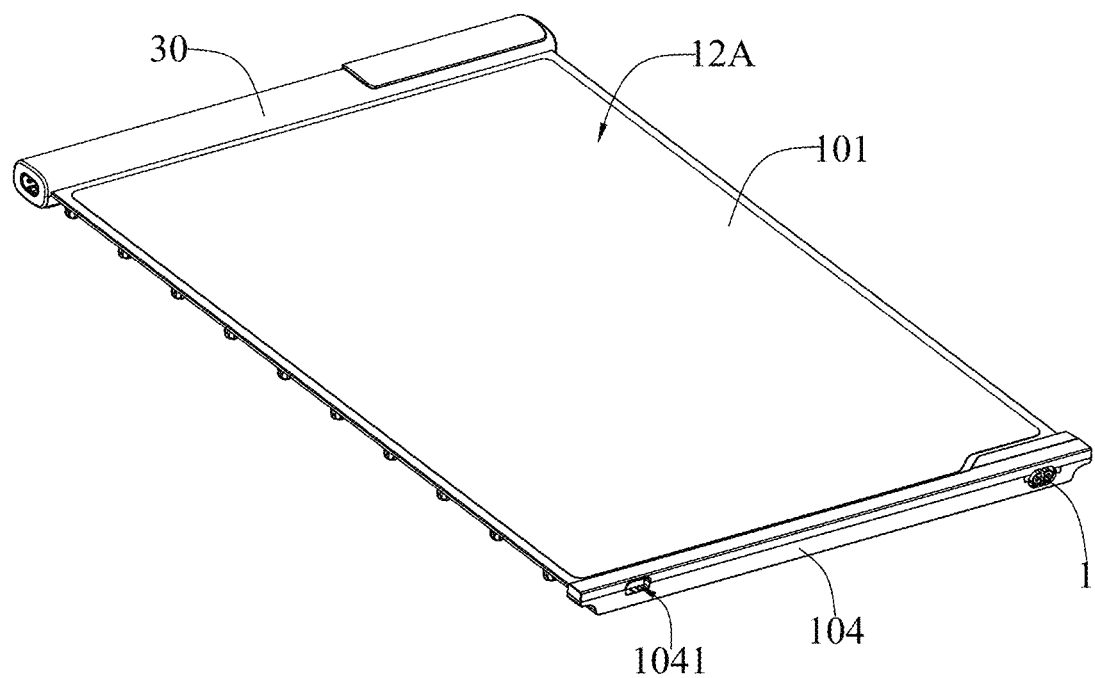
FIG. 5 is a perspective view of a first heating pad in accordance with the embodiments of the present disclosure.
Figure 6:
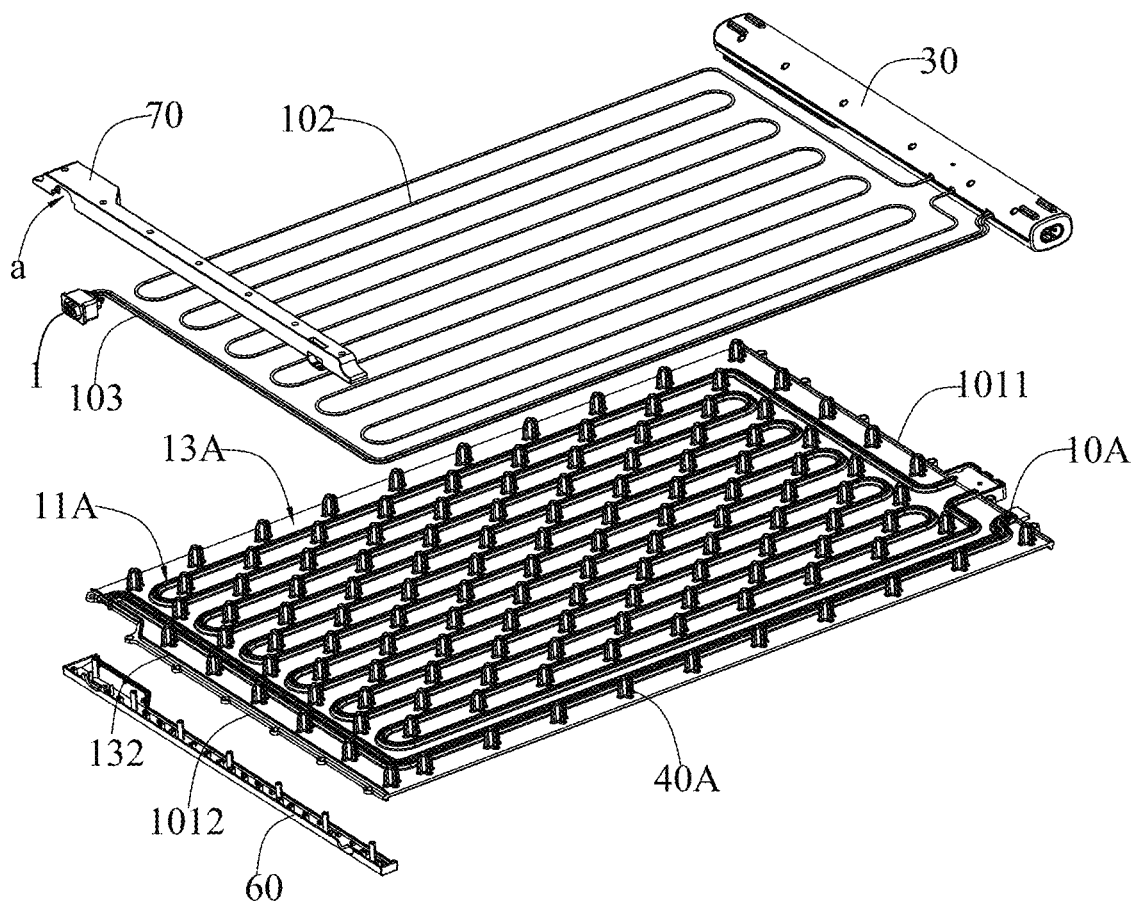
FIG. 6 is an exploded view of a first heating pad in accordance with the embodiments of the present disclosure.
Figure 7:
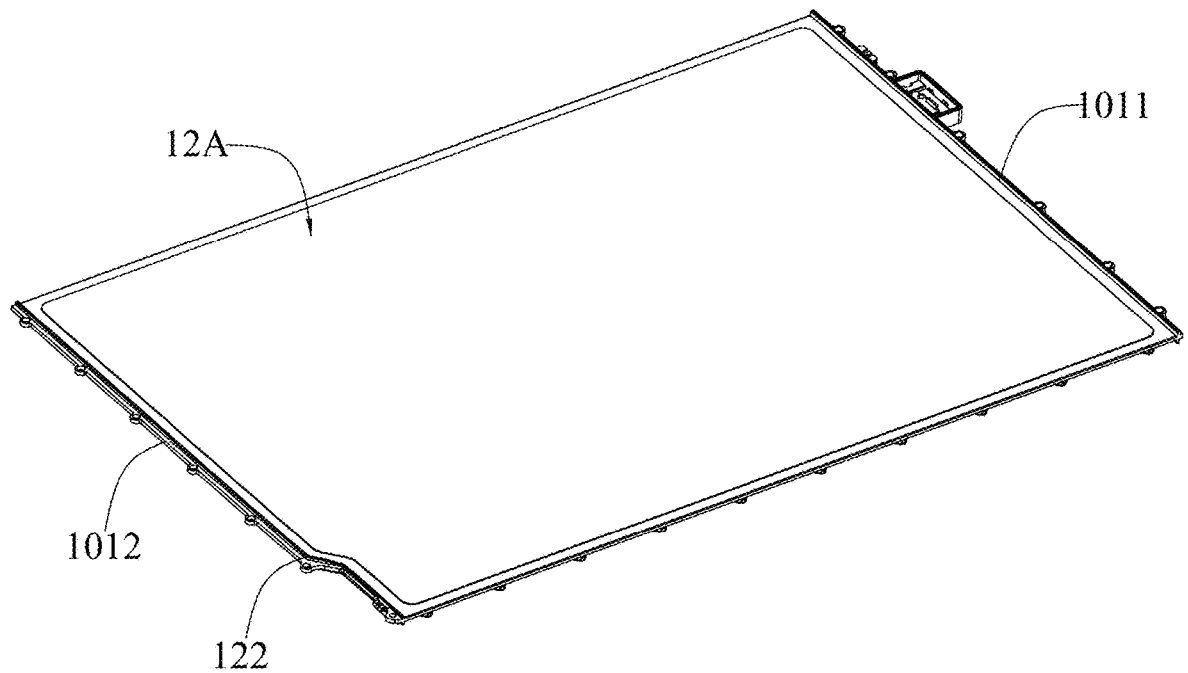
FIG. 7 is a perspective view of a first support panel of a first heating pad in accordance with the embodiments of the present disclosure.
Figure 8:
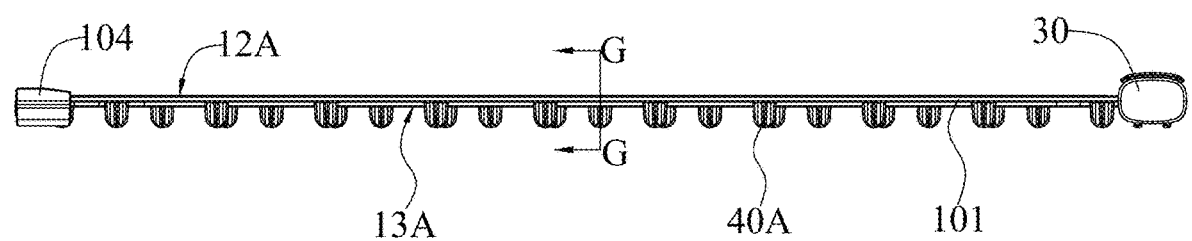
FIG. 8 is another perspective view of a first heating pad in accordance with the embodiments of the present disclosure.
Figure 9:
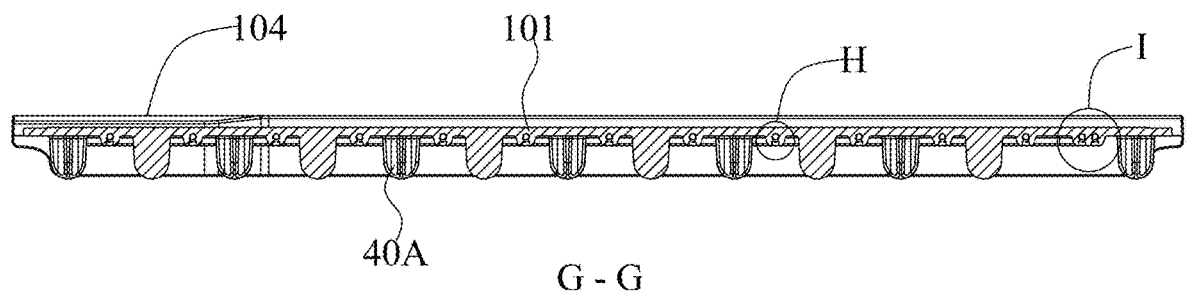
FIG. 9 is a cross-sectional view taken along the line G-G in FIG. 8.
Figure 10:
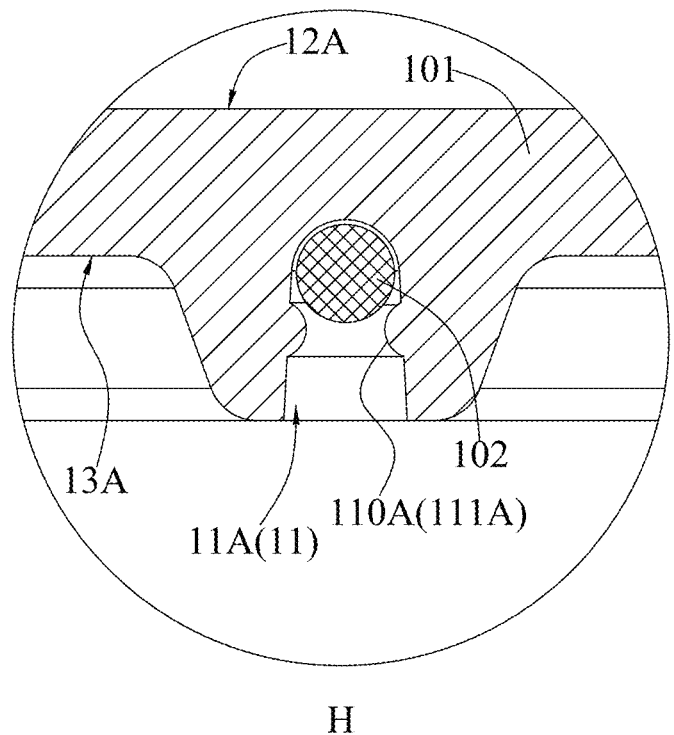
FIG. 10 is an enlarged view of area H in FIG. 9.
Figure 11:
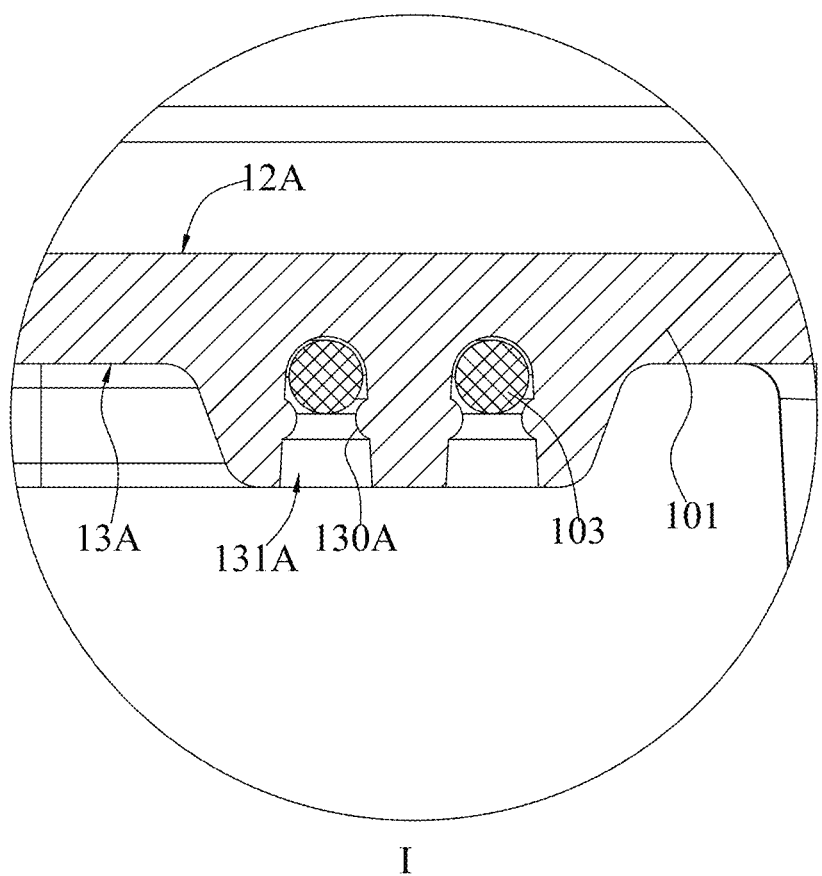
FIG. 11 is an enlarged view of area I in FIG. 9.
Figure 12:
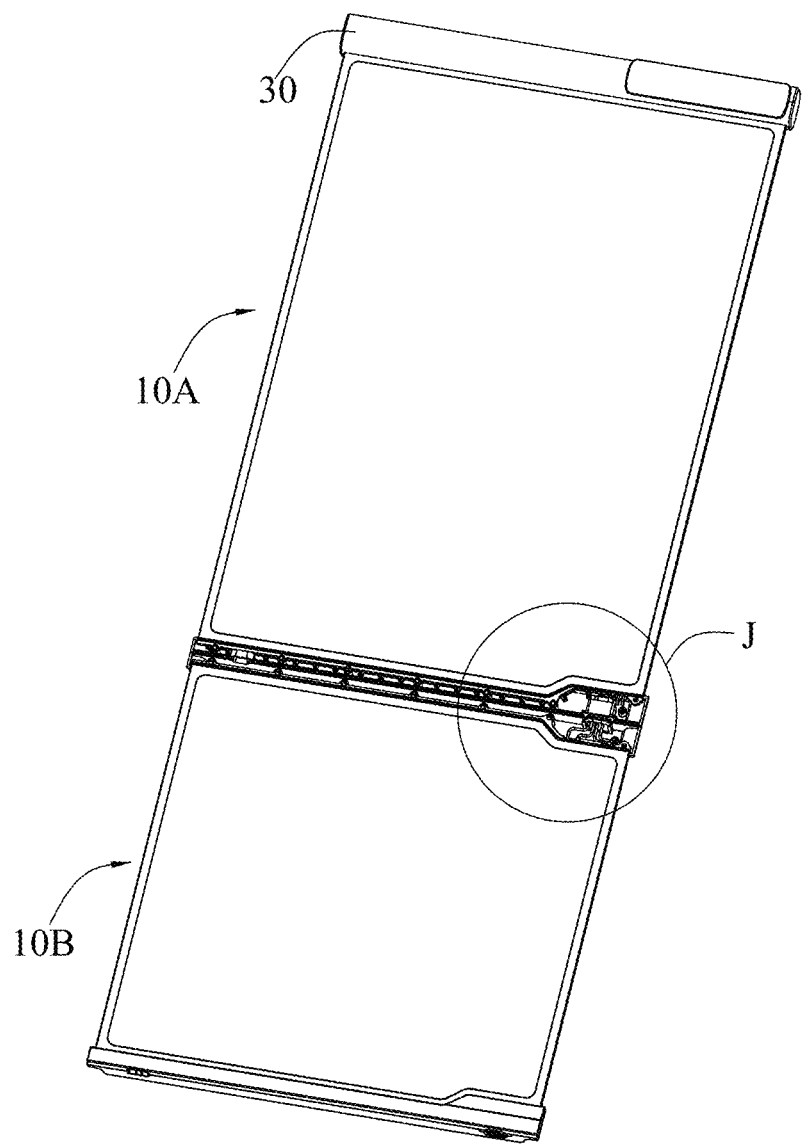
FIG. 12 is a perspective view of a first heating pad and a second heating pad being assembled in accordance with the embodiments of the present disclosure.
Figure 13:
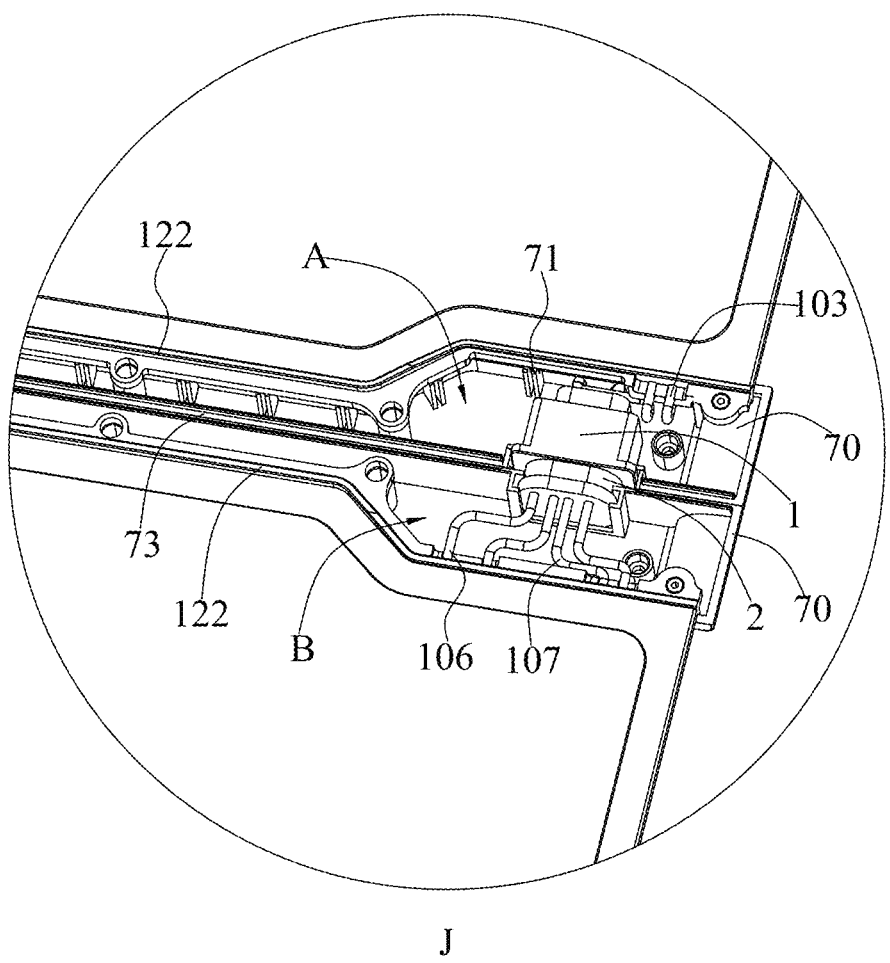
FIG. 13 is an enlarged view of area J in FIG. 12.
Figure 14:
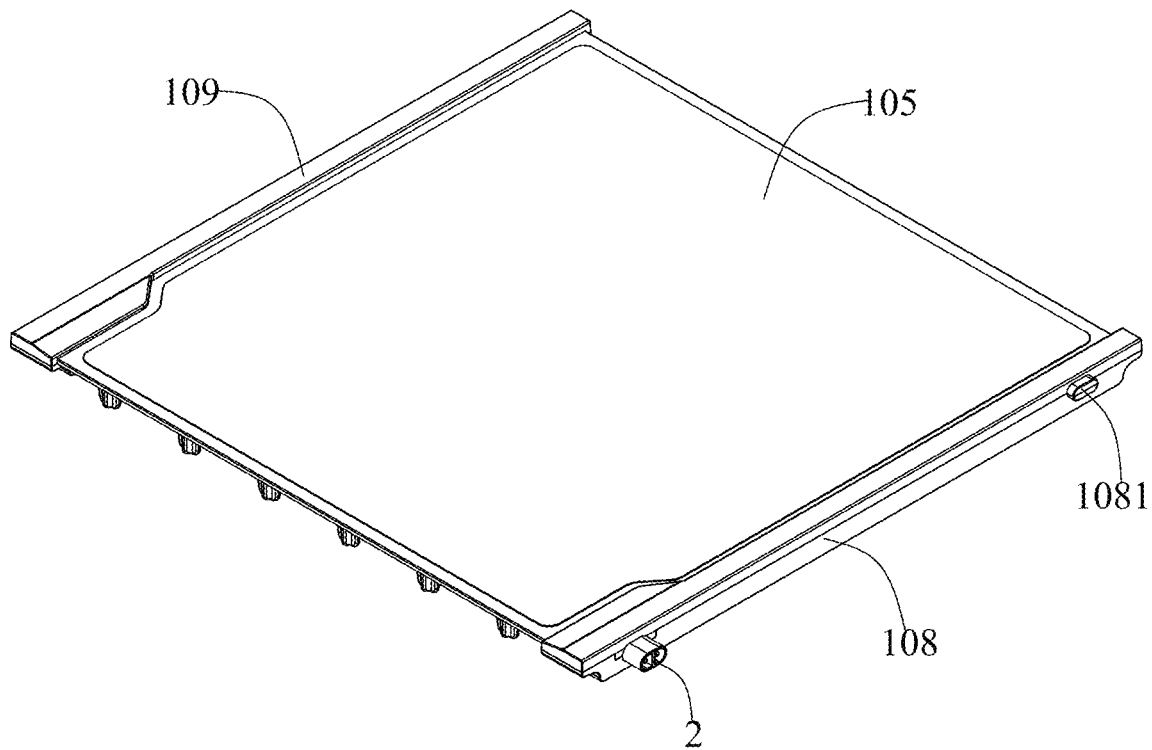
FIG. 14 is a perspective view of a second heating pad in accordance with the embodiments of the present disclosure.
Figure 15:
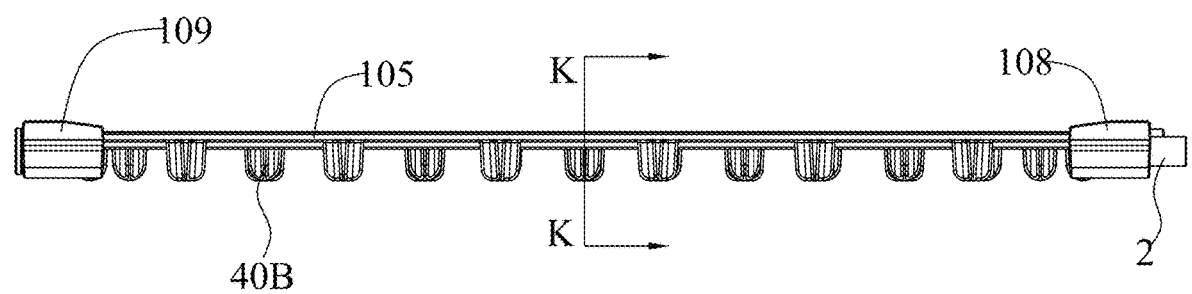
FIG. 15 is another perspective view of a second heating pad in accordance with the embodiments of the present disclosure.
Figure 16:
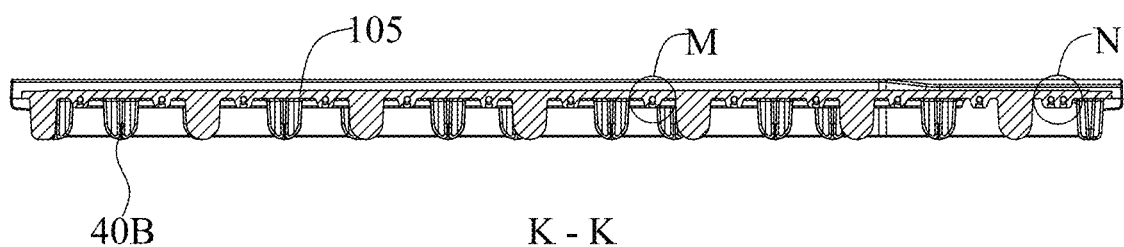
FIG. 16 is a sectional view taken along the line K-K in FIG. 15.
Figure 17:
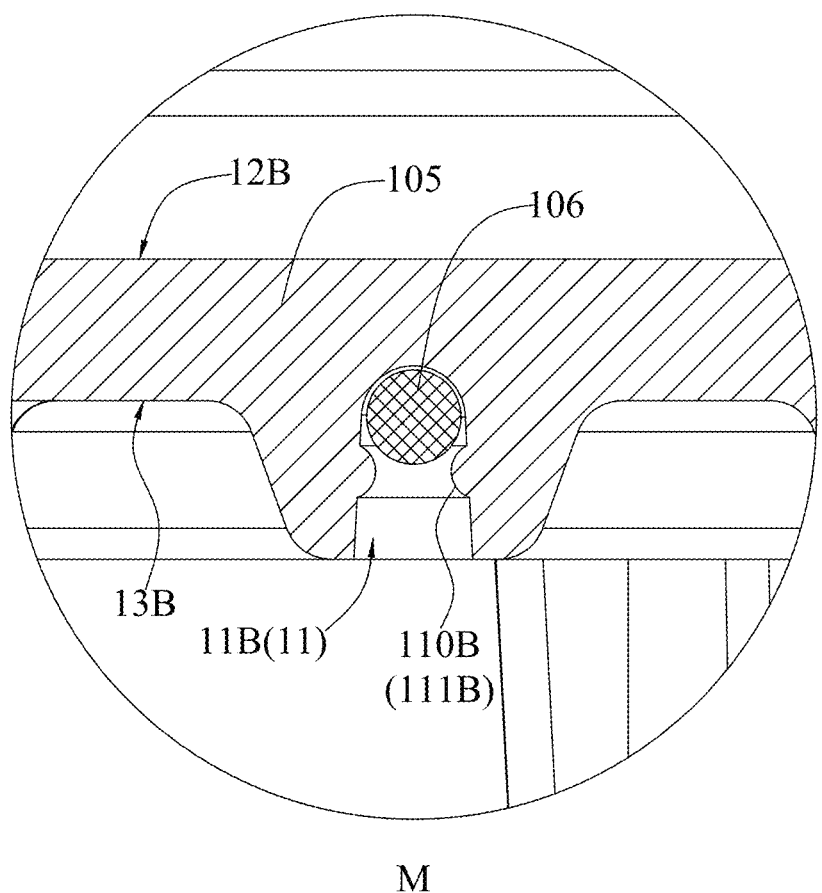
FIG. 17 is an enlarged view of area M in FIG. 16.
Figure 18:
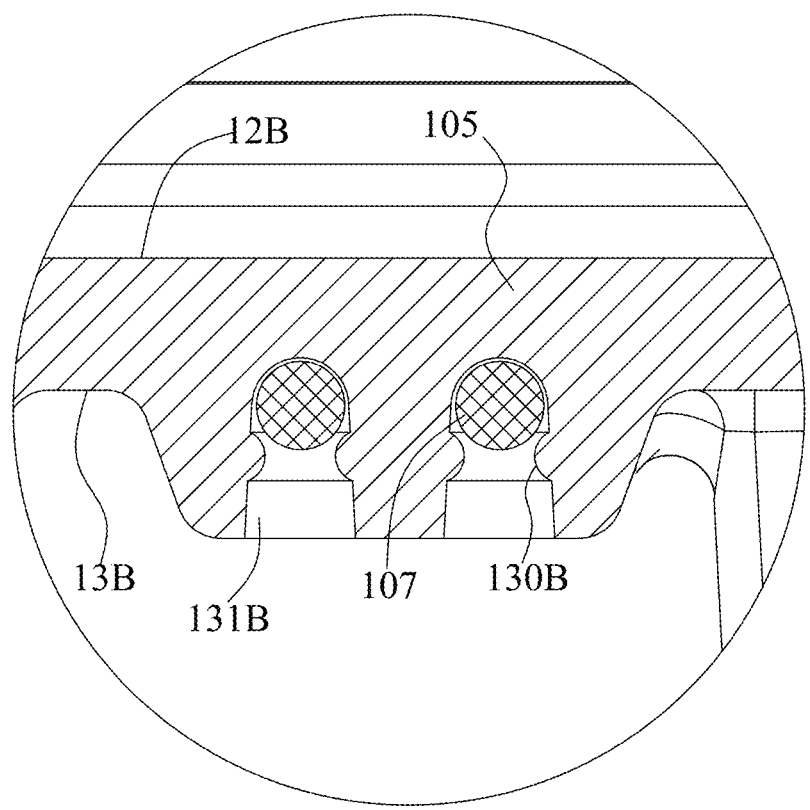
FIG. 18 is an enlarged view of area N in FIG. 16.
Figure 19:
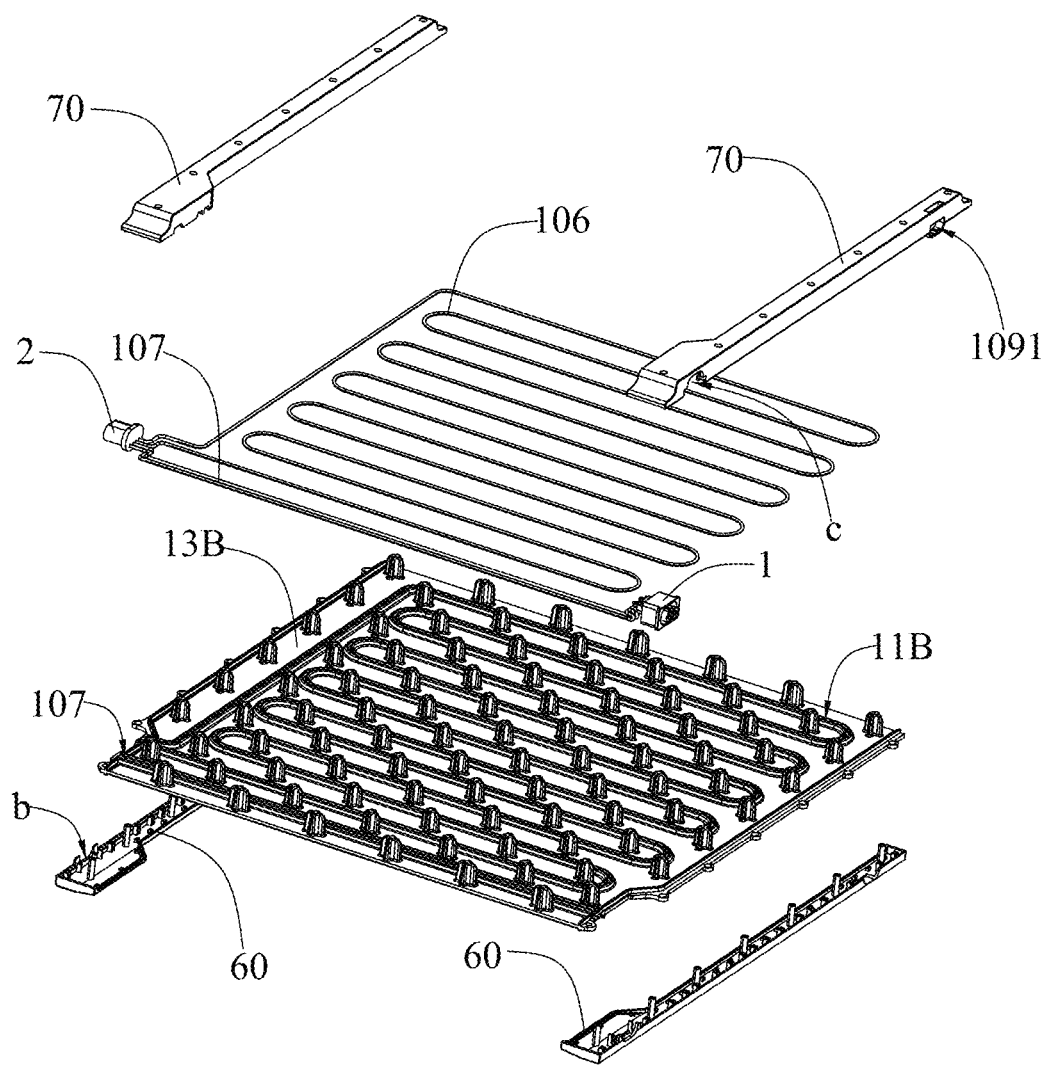
FIG. 19 is an exploded view of a second heating pad in accordance with the embodiments of the present disclosure.
Figure 20:
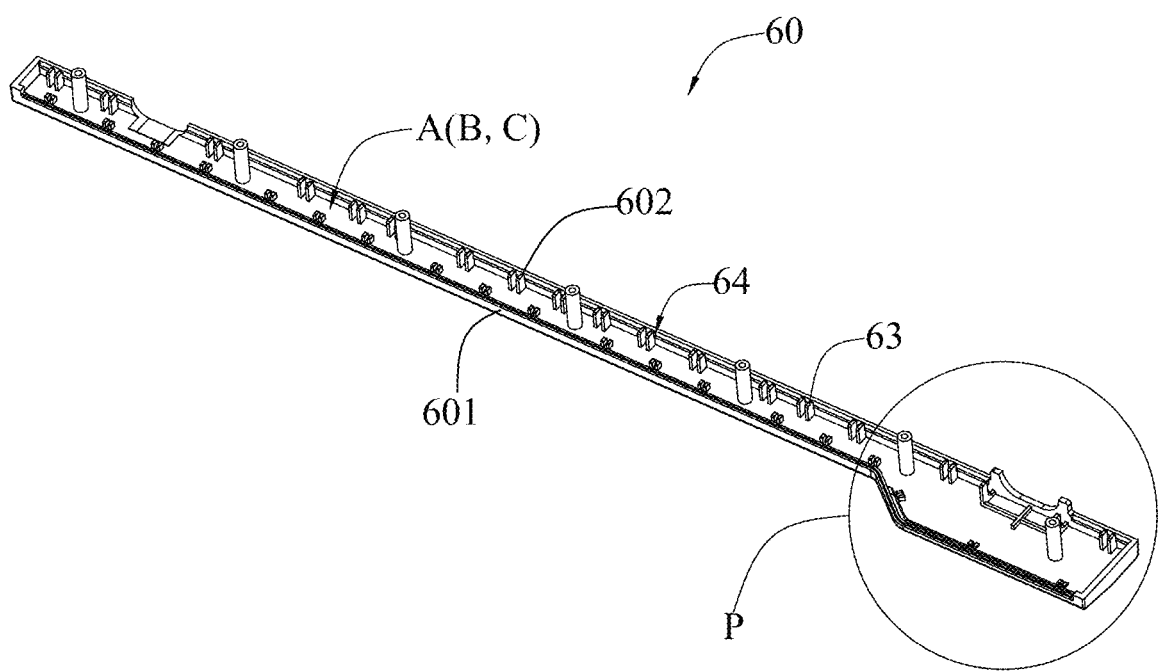
FIG. 20 is a perspective view of a first housing in accordance with the embodiments of the present disclosure.
Figure 21:
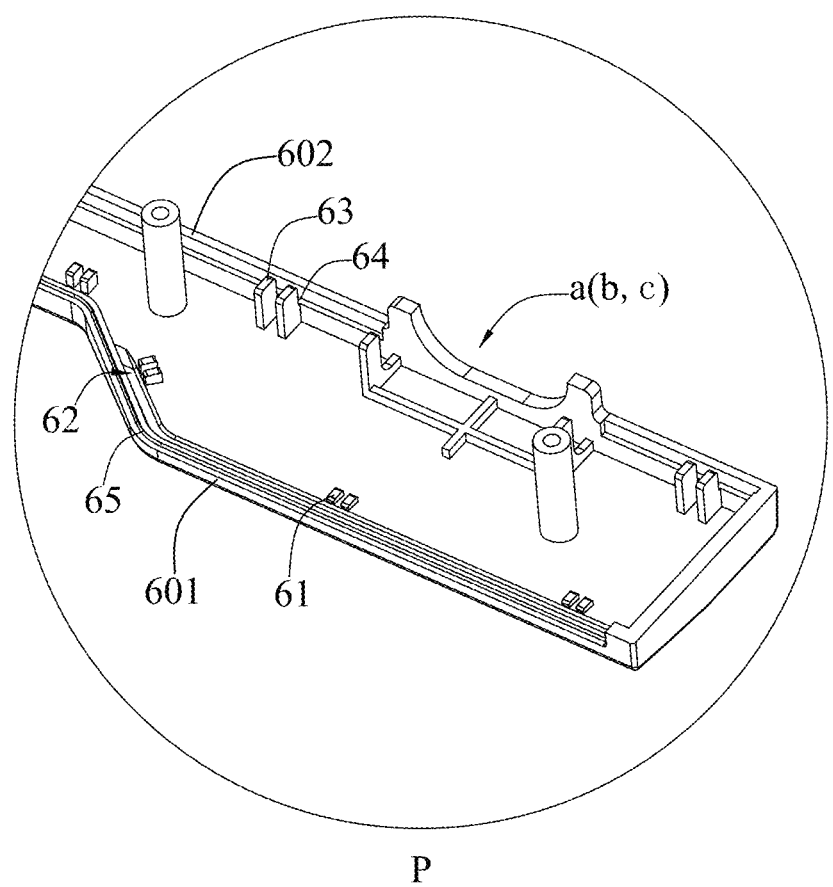
FIG. 21 is an enlarged view of area P in FIG. 20.
Figure 22:
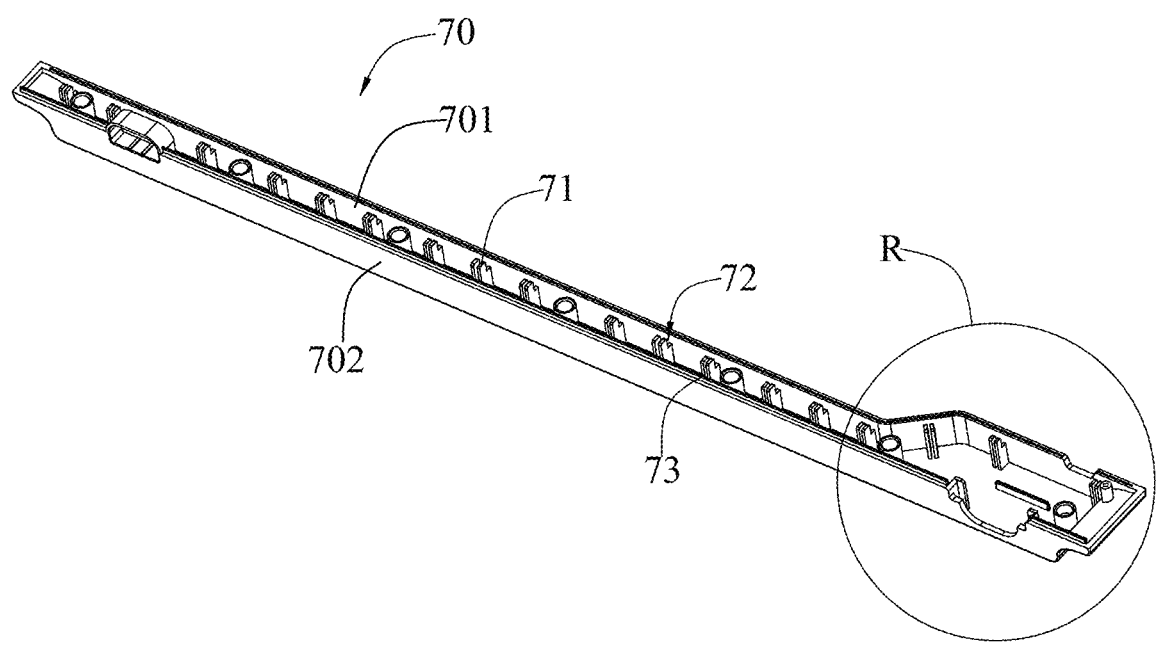
FIG. 22 is a perspective view of a second housing in accordance with the embodiments of the present disclosure.
Figure 23:
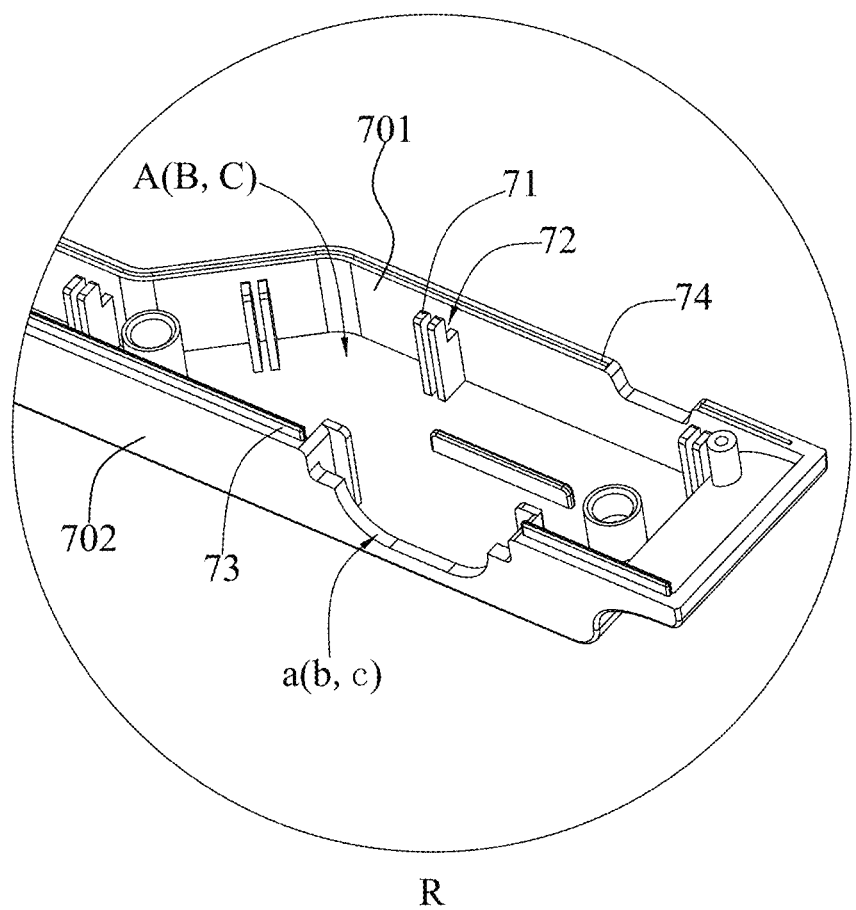
FIG. 23 is an enlarged view of area R in FIG. 22.
Figure 24:
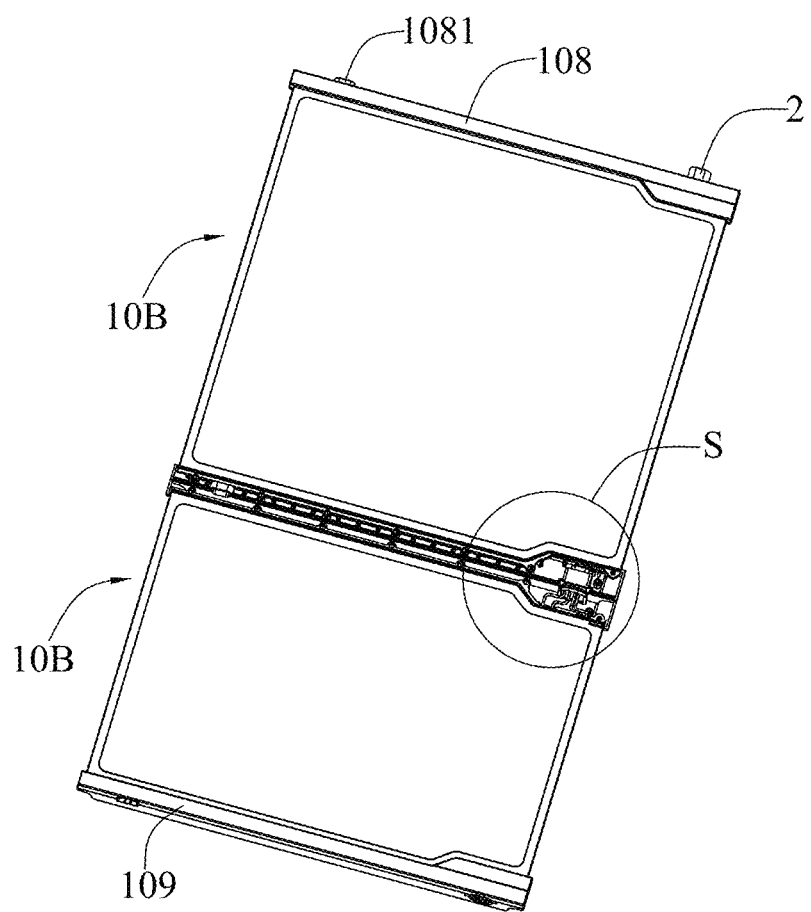
FIG. 24 is a perspective view of two adjacent second heating pads being assembled in accordance with the embodiments of the present disclosure.
Figure 25:
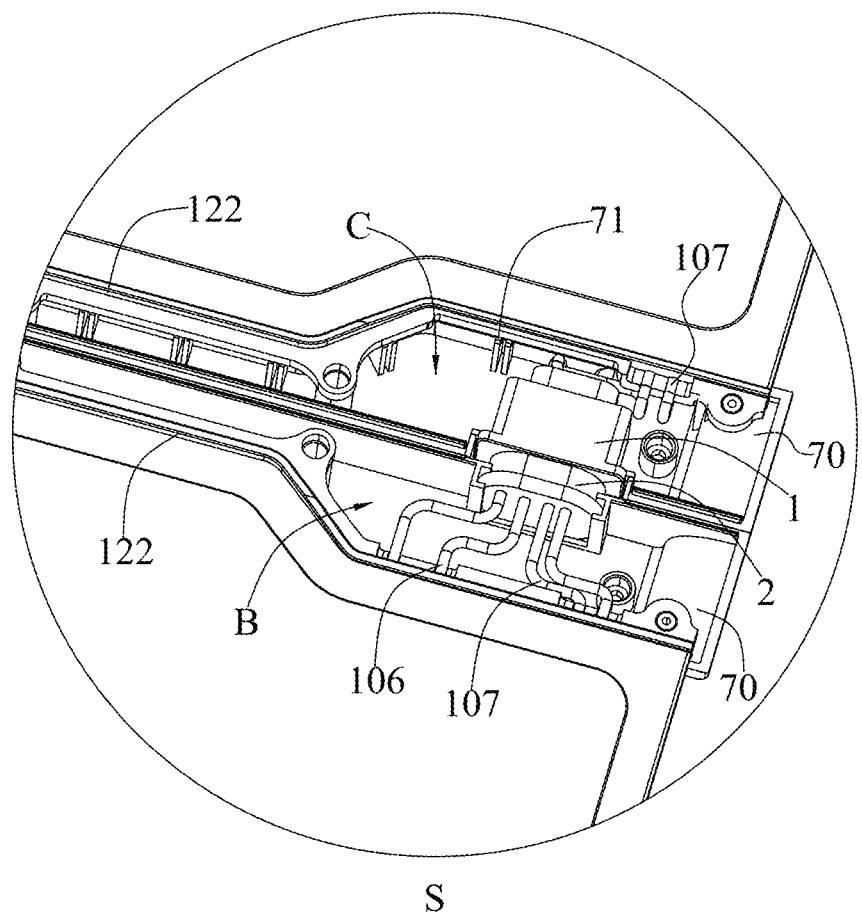
FIG. 25 is an enlarged view of area S in FIG. 22.

As shown in FIG. 1 and FIG. 2, proposed in the embodiments is a flexible food warming pad, including a heating pad 10 and a heating wire 20, in which the heating pad 10 is formed with a positioning groove 11 for threading the heating wire 20. The positioning groove 11 is uniformly distributed around the heating pad 10. The heating pad 10 is provided with a controller 30 to which an end of the heating wire 20 is connected. A side of the heating pad 10 is formed with a plurality of raised structures 40 having a same height. The heating pad 10 and the heating wire 20 are both made of flexible materials.

In some embodiments, an opening of the positioning groove 11 and the raised structures 40 are positioned on a same side of the heating pad 10.

In some embodiments, the heating wire 20 is made of flexible materials such as silicone, carbon fiber, graphene, PVC, and PTFE.

In some embodiments, the controller 30 is provided convexly and in a same direction as the protruding direction of the raised structures 40, and an opposite side of the heating pad 10 is of a planar structure.

In some embodiments, after the heating pad 10 is assembled with the heating wire 20, the overall temperature of the heating pad 10 rises as the heating wire 20 is powered on over time, and the heat is then transferred to the dishes thereon, achieving a heat preservation effect. In addition, as the heating wire 20 is extended uniformly around the heating pad 10, the temperature is relatively uniform at various places on the heating pad 10, increasing the heat preservation area on the heating pad 10. i.e., the heating pad 10 may be used for heating of a relatively large quantity of dishes.

In some embodiments, the flexible food warming pad further includes an adhesive 50 for encapsulating the heating wire 20 in the positioning groove 11.

In some embodiments, liquid silicone is selected to encapsulate the heating wire 20.

In some embodiments, the positioning groove 11 is formed with an opening for the heating wire 20 to be entered into, allowing the heating wire 20 to be detached from the opening under an external force easier. Therefore, encapsulation with the adhesive 50 ensures that the heating wire 20 is always fixed in the positioning groove 11 under an external force, i.e., it ensures the structural stability of the food warming pad.

In some embodiments, an inner side of the positioning groove 11 is provided with a limiting structure, the limiting structure includes two protrusions 111 disposed in opposite directions, and a distance between the protrusions 111 and the positioning groove 11 is greater than or equal to a diameter of the heating wire 20.

In some embodiments, the protrusions 111 are of a bar-shaped structure and are provided in a longitudinal direction of the positioning groove 11. The protrusions may also be provided in the form of a block structure and evenly distributed within the positioning groove 11.

In some embodiments, a cross-section of each of the protrusions 111 is of semicircular shape and their arcuate surfaces are disposed opposite to each other.

In some embodiments, a distance between the protrusions 111 is less than a diameter of the heating wire 20. However, as the heating wire 20 and the heating pad 10 are made of flexible materials, the protrusions 111 tend to expand outwardly when extruded by the heating wire 20, thereby allowing the heating wire 20 to pass through smoothly. The protrusions 111 returns to its original state due to the withdrawn of the external force, achieving an effective fixation effect on the heating wire 20.

In some embodiments, the protrusions 111 includes a first protrusion and a second protrusion. A first inner side of the positioning groove 11 is provided with the first protrusion, a second inner side of the positioning groove 11 is provided with the second protrusion, the first protrusion and the second protrusion face each other. A bottom surface of the positioning groove, a lower surface of the first protrusion and a lower surface of second protrusion define an open accommodating space, the heating wire 20 is received in the open accommodating space. A first gap is formed between the lower surface of the first protrusion and a first outer surface of the heating wire, a second gap is formed between the lower surface of the second protrusion and a second outer surface of the heating wire 20.

In some embodiments, the protrusions 111 achieve a fixation effect on the heating wire 20, and then the adhesive 50 fills gaps in the positioning groove 11 to achieve another fixation effect on the heating wire 20, which greatly ensures the fixation of the heating wire 20.

In some embodiments, a beginning segment and an end segment of the positioning groove 11, provided in parallel to each other, are extended toward an outer edge of the flexible food warming pad, then bent in a U-shape repeatedly toward a centerline of the heating pad 10, and finally communicated to form a continuous groove 11.

In some embodiments, the beginning segment and the end segment of the positioning groove 11 are positioned at a same shorter edge of the heating pad 10 and each is extended in a direction along a longer edge. The positioning groove 11 is then bent in a U-shape repeatedly and extended further in a direction along the longer edge until it is connected to the beginning or end segment.

In some embodiments, the positioning groove 11 provided by adopting the aforementioned solution effectively ensures that it is uniformly provided along the heating pad 10, thereby ensuring that the heat from the heating wire 20 achieves the overall heating effect of the heating pad 10.

In some embodiments, the controller 30 is provided on an end of the heating pad 10, and both ends of the heating wire 20 are connected to the controller 30.

In some embodiments, an end of the controller 30 proximal to an edge of the heating pad 10 is provided with a terminal 31. In some embodiments, the terminal 31 is configured to connect to an external power source and supplies power to the heating wire 20, enabling it to function properly. In some embodiments, the terminal 31 is a Type-C port. In other embodiments, the terminal 31 may also be a DC round hole interface, a USB-C interface, or other types of interfaces, as long as it may supply power to the heating pad 10.

In some embodiments, the raised structures 40 are distributed on a backside of the heating pad 10, and a front side of the heating pad 10 is overlaid with a thermochromic layer. The front side serves for holding food, while the back side is where the heating wire 20 and adhesive 50 are arranged. When the warming pad is in operation, the presence of the raised structures 40 not only prevent the heat generated by the heating wire 20 from directly transferring to the tabletop or counter through the adhesive 50, which could damage the contact surface, but also facilitates the dissipation of heat from the bottom of the heating pad 10, thereby avoiding damage to the heating wire 20 due to overheating.

In some embodiments, the thermochromic layer includes a pattern and a color of the pattern changes as the temperature is increased. In some embodiments, the closer the color is to red, the higher the temperature.

In some embodiments, an end of each raised structure 40 is hemispherical, which may effectively ensure the support effect of the raised structure 40 on the heating pad 10, and also accelerate the circulation rate of the air under the heating pad 10.

In summary, proposed in the embodiments is a flexible food warming pad, which includes a heating pad and a heating wire made of flexible material, achieving the heat preservation effect after being powered on. In addition, it may also be stored after being rolled up, while maintaining the normal functionality after repeated rolling and unrolling.

Firstly, in the proposed technical solution of the present disclosure, the heating pad and the heating wire are both made of flexible materials, i.e., the food warming pad may be stored by rolling up, and the heating wire is sealed in the positioning groove by adhesive, so that the normal functionality of the food warming pad may be guaranteed by repeated rolling up and releasing, which greatly improves the storage convenience and ensures the service life of the product.

Secondly, in the proposed technical solution of the present disclosure, the first protrusion and the second protrusion in the positioning groove effectively ensures the fixation of the heating wire in the positioning groove and ensures the position of the heating wire is fixed during normal use and during the process of rolling up and storage, thereby ensuring the normal use of the product.

Thirdly, in the proposed technical solution of the present disclosure, the positioning groove is provided in such a way as to effectively ensure that the heating wire is uniformly distributed over an area of the heating pad, thereby rendering the heating effect uniform at various places on the heating pad, which greatly increases the heat preservation area on the food warming pad, and improves the utilization rate of the food warming pad.

Fourthly, in the proposed technical solution of the present disclosure, a surface of the food warming pad is also provided with a thermochromic layer, which is configured to warn the current surface temperature of the food warming pad, which avoids burns caused by accidental touching and improves the safety of the food warming pad.

As illustrated in FIG. 3 to FIG. 25, the embodiments also provide a modular food warming pad that may be assembled by joining two or more heating pads 10 together, thereby increasing the overall area of the warming pad and enhancing its versatility. In addition, each warming pad may also be used separately, further increasing the variety of ways the warming pad may be utilized.

In some embodiments, the modular food warming pad includes a first heating pad 10A and a second heating pad 10B. The first heating pad 10A and the second heating pad 10B are assembled with each other and in circuit connection. The design of the modular food warming pad allows a user to consider factors such as the size of the table and the amount of food, and to assemble a warming pad of appropriate size, thereby improving its applicability and flexibility.

As illustrated in FIG. 3 to FIG. 7, in some embodiments, the first heating pad 10A is provided with one unit, while the second heating pad 10B is provided with multiple units. These multiple second heating pads 10B are interconnected and have a continuous electrical circuit.

In some embodiments, the multiple second heating pads 10B are assembled along a first direction L1 of the first heating pad 10A. The first direction L1 is the longitudinal direction of the first heating pad 10A. The modular food warming pad in this way allows a user to expand the usable area of the warming pad according to their needs. Expanding the usable area of the warming pad in the longitudinal direction makes it more suitable for use on a long rectangular dining table.

In some embodiments, the first heating pad 10A includes a first support panel 101, a first heating source 102, a first wire 103, a controller 30 and a first connector 104.

In some embodiments, the first support panel 101 has an assembly end 1011 and a connection end 1012. The first heating source 102 and the first wire 103 are both arranged on the first support panel 101. The controller 30 is connected to the assembly end 1011. The first heating source 102 is electrically connected to the controller 30. The first connector 104 is connected to the connection end 1012. The first wire 103 has a first end and a second end. The first end of the first wire 103 is electrically connected to the controller 30, and the second end of the first wire 103 is electrically connected to the first connector 104.

As illustrated in FIG. 14 to FIG. 19, the second heating pad 10B includes a second support panel 105, a second heating source 106, a second wire 107, a second connector 108 and a third connector 109.

In some embodiments, the second heating source 106 and the second wire 107 are arranged on the second support panel 105. The second connector 108 is connected to the second support panel 105, and the third connector 109 is also connected to the second support panel 105. The second connector 108 and the third connector 109 are arranged on different sides of the second support panel 105. The second wire 107 has a first end and a second end. The first end of the second wire 107 is electrically connected to the first end of the second connector 108, and the second end of the second wire 107 is electrically connected to the first end of the third connector 109.

The second end of the second connector 108 is connected to the first connector 104, allowing the first heating pad 10A and the second heating pad 10B to be electrically assembled along the first direction L1. The third connector 108 is connected to the second end of the third connector 109 of another adjacent second heating pad 10B, allowing the two adjacent second heating pads 10B to be electrically assembled along the first direction L1. The modular food warming pad configured in this way may be expanded along the longitudinal direction of the first heating pad 10A when in use, i.e., the usable area of the modular food warming pad extends along the longitudinal direction of the first heating pad 10A. This may not only allow for heating more meals simultaneously, but also is more suitable for use on a long rectangular dining table.

In some embodiments, the first heating source 102 and the second heating source 106 are both heating wires, and are respectively the first heating wire and the second heating wire. In other embodiments, the first heating source 102 and the second heating source 106 may also be heating films, heating sheets, etc., as long as they may be powered on and generate heat.

In some embodiments, the first heating source 102 and the second heating source 106 are both flexible heating wires. The first support panel 101 and the second support panel 105 are both flexible panels. When the first support panel 101 and the second support panel 105 are curled and folded, the first heating source 102 and the second heating source 106 are curled synchronously. In some embodiments, the first support panel 101 and the second support panel 105 are flexible silicone pads. In other embodiments, the first support panel 101 and the second support panel 105 may also be rubber pads.

As illustrated in FIG. 7 to FIG. 19, in some embodiments, the first support panel 101 and the second support panel 105 both include first side surfaces 12A (12B) and second side surfaces 13A (13B), respectively. The positioning groove 11 is arranged on the second side surfaces 13A (13B), respectively. In some embodiments, the positioning groove 11 includes a first positioning groove 11A and a second positioning groove 11B. The first positioning groove 11A is evenly arranged on the second side surface 13A, and the first heating source 102 is threaded and fixed in the first positioning groove 11A. The second positioning groove 11B is evenly arranged on the second side surface 13B, and the second heating source 106 is threaded and fixed in the second positioning groove 11B.

In some embodiments, a clamping structure is provided on an inner side of the positioning groove 11, and the clamping structure includes a first clamping structure 110A and a second clamping structure 110B. In some embodiments, the first clamping structure 110A is provided on the inner side wall of the first positioning groove 11A. The first clamping structure 110A limits the first heating source 102 in the first positioning groove 11A. The second clamping structure 110B is provided on an inner side wall of the second positioning groove 11B. The second clamping structure 110B limits the second heating source 106 in the second positioning groove 11B. The first and second heating sources 102 and 106 are respectively limited by the first and second clamping structures 110A and 110B, preventing the first and second heating sources 102 and 106 from escaping from these grooves. This not only facilitates the manufacture of the warming pad, but also facilitates further securement of the first and second heating sources 102 and 106.

In some embodiments, the first clamping structure 110A and the second clamping structure 110B are both clamps, and are respectively the first clamp 111A and the second clamp 111B. In some embodiments, the first clamp 111A is protruded on the inner side wall of the first positioning groove 11A. A distance between the first clamp 111A and a bottom of the first positioning groove 11A is at least equal to a diameter of the first heating wire. The second clamp 111B is protruded on the inner side wall of the second positioning groove 11B. A distance between the second clamp 111B and a bottom of the second positioning groove 11B is at least equal to a diameter of the second heating wire.

It should be noted that the clamp may be a group of protrusions arranged only on one inner side wall of the positioning groove 11, or it may be two groups of parallel protrusions arranged on two inner side walls of the positioning groove 11, respectively. The clamp may be a continuous protrusion integrally formed along the inner side wall of the positioning groove 11, or it may be multi-segmented protrusions integrally formed on the inner side wall of the positioning groove 11 and arranged at intervals on a same plane. The clamp may be a strip-shaped protrusion with a semicircular cross section, a strip-shaped protrusion with a wedge-shaped cross section, or a dot-shaped protrusion which is hemispherical. In other words, the clamp only needs to be able to limit the flexible heating wire in the positioning groove 11. In some embodiments, the clamp is two groups of continuous protrusions parallel to each other arranged on the two inner side walls of the positioning groove 11, respectively, and the spacing between the two groups of continuous protrusions is less than the diameter of the flexible heating wire.

As illustrated in FIG. 7 to FIG. 19, in some embodiments, a wire groove is also provided on the second side surface 13A (13B), and the wire groove includes a first wire groove 131A and a second wire groove 131B. In some embodiments, the first wire 103 is threaded and fixed in the first wire groove 131A, and the second wire 107 is threaded and fixed in the second wire groove 131B. The setting of the wire groove facilitates the assembly of the first wire 103 and the second wire 107, further facilitating the manufacture of the warming pad.

In some embodiments, a positioning part is provided in the wire groove, and the positioning part includes: a first positioning part 130A and a second positioning part 130B. The first positioning part 130A is protruded on an inner side wall of the first wire groove 131A. A distance between the first positioning part 130A and a bottom of the first wire groove 131A is at least equal to a diameter of the first wire 103, thereby limiting the first wire 103 in the first wire groove 131A. The second positioning part 130B is protruded on an inner side wall of the second wire groove 131B. A distance between the second positioning part 130B and a bottom of the second wire groove 131B is at least equal to a diameter of the second wire 107, thereby limiting the second wire 107 in the second wire groove 131B. The first positioning part 130A and the second positioning part 130B respectively limit the first wire 103 and the second wire 107, preventing the first wire 103 and the second wire 107 from slipping out of the positioning grooves. This is more conducive to further fixing the first heating source 102 and the second heating source 106, and further facilitates the manufacture of the warming pad.

The positioning part may be a group of protrusions only arranged on one inner side wall of the wire groove, or two groups of parallel protrusions arranged on two inner side walls of the wire groove, respectively. The positioning part may be a continuous protrusion integrally formed along the inner side wall of the wire groove, or a plurality of protrusions integrally formed on the inner side wall of the wire groove and arranged at intervals on a same plane. The positioning part may be a strip-shaped protrusion with a semicircular cross section, a strip-shaped protrusion with a wedge-shaped cross section, or a dot-shaped protrusion with a hemispherical cross section. In other words, the positioning part only needs to be able to limit the first wire 103 and the second wire 107 in the positioning grooves. In some embodiments, the positioning part is two groups of continuous protrusions parallel to each other arranged on the two inner side walls of the wire groove, respectively.

In some embodiments, the first heating pad 10A and the second heating pad 10B both include adhesive. The adhesive respectively encapsulates the flexible heating wire is encapsulated in the positioning groove 11, the first wire 103 and the second wire 107 in the wire groove. The setting of the adhesive may not only fix the first heating source 102, the second heating source 106, the first wire 103 and the second wire 107, but also improve the integrity of the first heating pad 10A and the second heating pad 10B.

As illustrated in FIG. 7 to FIG. 19, in some embodiments, a raised structure is also arranged on the second side surface 13A (13B), and the raised structure includes a first raised structure 40A and a second raised structure 40B. The first raised structure 40A is protruded on the second side surface 13A. A plurality of first raised structures 40A are provided, with their heights being equal and evenly distributed on the second side surface 13A. The second raised structure 40B is protruded on the second side surface 13B. A plurality of second raised structures 40B are provided, with their heights being equal and evenly distributed on the second side surface 13B.

In some embodiments, the height range of the first raised structure 40A and the second raised structure 40B is between 10 and 20 mm. The height of the raised structure within this range results in a gap between the heating area and the bearing surface when in use. This gap reduces the occurrences of high temperature burning the bearing surface and damages to the heating wire due to curling and folding. In some embodiments, the height of the first raised structure 40A and the second raised structure 40B is 15 mm.

As illustrated in FIG. 3 to FIG. 6, FIG. 12 to FIG. 14, and FIG. 19 to FIG. 25, in some embodiments, the first connector 104, the second connector 108 and the third connector 109 each includes a housing and a connection terminal. The housing has a mounting cavity A (B/C), and a side wall of the mounting cavity A (B/C) is provided with an assembly opening a (b/c) that runs through the side wall of the housing. The connection terminal is fixedly installed at the assembly opening a (b/c). The connection terminal has a first end and a second end; the first end extends into the mounting cavity A (B/C) and is connected to the first wire 103 or the second wire 107; the second end is installed in the assembly opening a (b/c).

In some embodiments, the connection terminal includes: a first female terminal 1 and a first male terminal 2. A first female terminal 1 is provided on the first connector 104, and the first female terminal 1 is fixedly installed in the assembly opening a. The first end of the first female terminal 1 extends into the mounting cavity A and is electrically connected to the first wire 103, and the second end is located in the assembly opening a. A first male terminal 2 is provided on the second connector 108, and the first male terminal 2 is installed in the assembly opening b. The first end of the first male terminal 2 extends into the mounting cavity B and is electrically connected to the first end of the second wire 107, and the second end extends out of the assembly opening b. The third connector 109 is also provided with a first female terminal 1, which is fixedly installed in the assembly opening c. The first end of the first female terminal 1 on the third connector 109 extends into the mounting cavity C and is electrically connected to the second end of the second wire 107, and the second end is located at the assembly opening c. The first male terminal 2 is configured to plug with and be electrically connected the first female terminal. The setting of the connection terminal is sufficient to enable the first connector 104, the second connector 108 and the third connector 109 to be electrically connected.

In some embodiments, the housing of the first connector 104, the housing of the second connector 108 and the housing of the third connector 109 have the same structure and each includes: a first housing 60 and a second housing 70. The first housing 60 is connected to the second housing 70, and is surrounded to form the mounting cavity A (B/C).

As illustrated in FIG. 12, FIG. 13 and FIG. 19 to FIG. 25, in some embodiments, a first tongue 61 is provided on the inner wall of the first housing 60, and the first tongue 61 extends toward one side of the second housing 70. A first accommodation port 62 is formed between the first tongue 61 and the first side wall 601 of the first housing 60. A second tongue 71 is provided on the second housing 70, and the second tongue 71 extends toward one side of the first housing 61. A second accommodation port 72 is formed between the second tongue 71 and the first side wall 701 of the second housing 70. When the first connector 104 is assembled with the first support panel 101, the first tongue 61 and the second tongue 71 cooperate with each other to allow the housing of the first connector 104 to be fixed to the first support panel 101. When the second connector 108 is assembled with the second support panel 105 or the third connector 109 is assembled with the second support panel 105, the first tongue 61 and the second tongue 71 cooperate with each other to allow the housing of the second connector 106 to be fixed to the second support panel 105, or the housing of the third connector 109 is fixed to the second support panel 105.

The first side surface 12A (12B) is protruded with a first strip 122, and the second side surface 13A (13B) is protruded with a second strip 132. When the first support panel 101 or the second support panel 105 is assembled with the housing, the first strip 122 is accommodated in the first accommodation port 62; the second strip 132 is accommodated in the second accommodation port 72. The first housing 60 and the second housing 70 are fixedly connected by fastening screws, so that the first strip 122 and the second strip 132 are respectively limited in the first accommodation port 62 and the second accommodation port 72, thereby improving the stability of the connection between the housing and the first support panel 101 or the second support panel 105.

In some embodiments, a third tongue 63 is provided on one side of the first housing 60, and a third accommodation port 64 is formed between the third tongue 63 and the second side wall 602 of the first housing 60. A mounting strip 73 is protruded on the side surface of the second housing 70, and the mounting strip 73 is located on the second side wall 702 of the second housing 70. The second side wall 602 of the first housing 60 and the second side wall 702 of the second housing 70 are provided with a part of the assembly opening a (b/c). When the first housing 60 and the second housing 70 are matched, the second side wall 602 of the first housing 60 and the second side wall 702 of the second housing 70 fit together to form the assembly opening a (b/c). When the first housing 60 and the second housing 70 are assembled, the mounting strip 73 is assembled in the third accommodation port 64. The housings arranged in this way may improve the supporting strength of the first housing 60 and the second housing 70, thereby preventing the housings from being sunken.

In some embodiments, a first pressing strip 65 is also provided on the side surface of the first side wall 601 of the first housing 60. A second pressing strip 74 is provided on the side surface of the first side wall 701 of the second housing 70. In some embodiments, the first support panel 101 and the second support panel 105 are both silicone pads. An edge of the first pressing strip 65 and an edge of the second pressing strip 74 are both sharp edges. When the first housing 60 and the second housing 70 are locked by fastening screws, the first pressing strip 65 and the second pressing strip 75 are partially embedded in the first support panel 101 or the second support panel 105. This enhances the stability of the first support panel 101 with the first connector 104 and the stability of the second support panel 105 with the second connector 108 and the third connector 109, thereby improving the integrity of the first heating pad 10A and the second heating pad 10B.

In some embodiments, a first connection portion 1041 is provided on the first connector 104, a second connection portion 1081 is provided on the second connector 108, and a third connection portion 1901 is provided on the third connector 109. The second connection portion 1801 is adapted to both the first connection portion 1041 and the third connection portion 1091. In some embodiments, the first connection portion 1041 and the third connection portion 1091 are respectively provided as sockets on the first connector 104 and the third connector 109; the second connection portion 1081 is a plug protruding from the second connector 108. The first connection portion 1041, the second connection portion 1801 and the third connection portion 1091 may effectively improve the tightness and stability of the second connector 108 and the first connector 104 or the third connector 109 during assembly.

Figure 26:
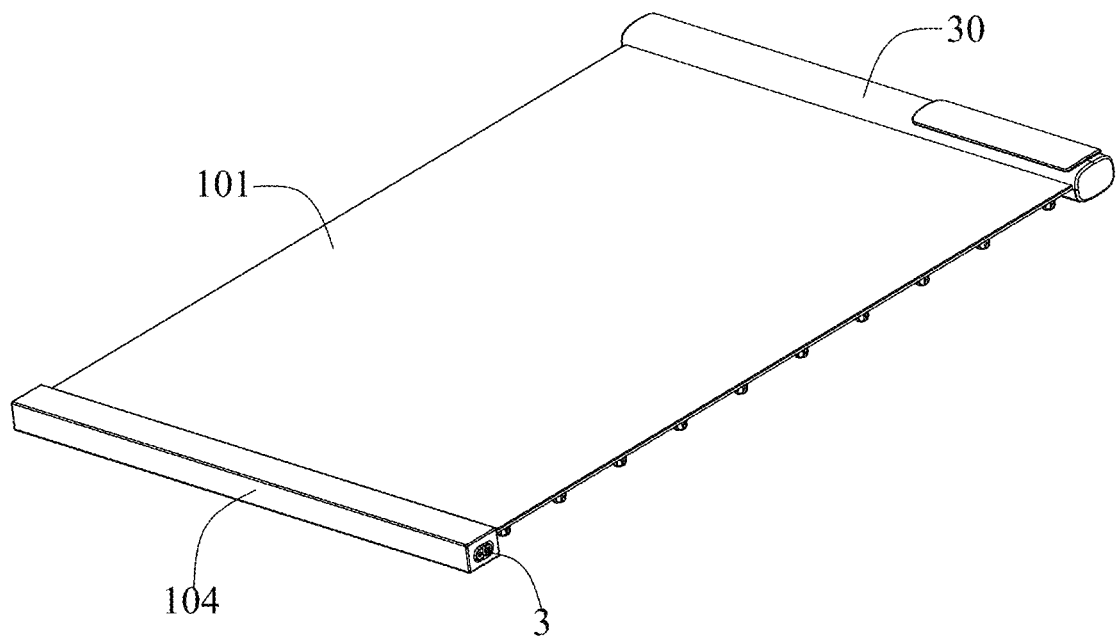
FIG. 26 is a perspective view of a first heating pad in accordance with the embodiments of the present disclosure.
Figure 27:
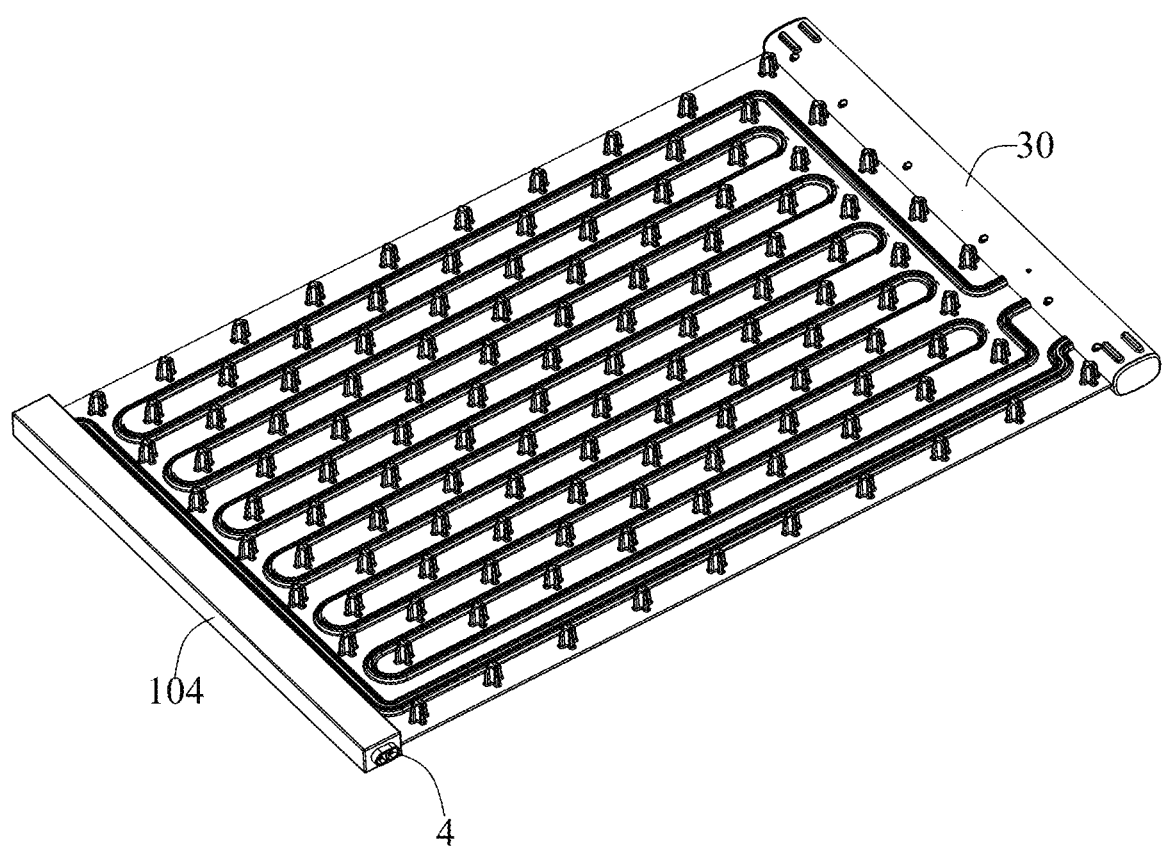
FIG. 27 is another perspective view of a first heating pad in accordance with the embodiments of the present disclosure.
Figure 28:
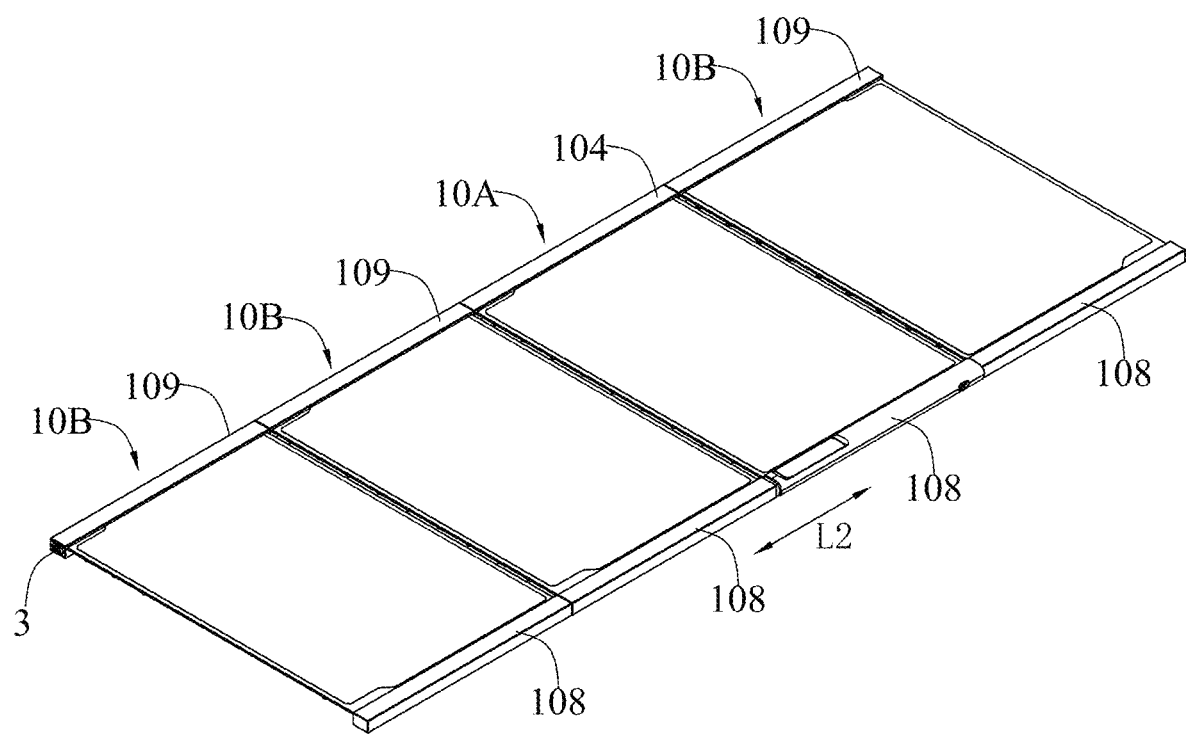
FIG. 28 is a perspective view of a first heating pad and a second heating pad being assembled along a second direction in accordance with the embodiments of the present disclosure.

As illustrated in FIG. 26 to FIG. 28, in some embodiments, a plurality of second heating pads 10B are assembled along a second direction L2 of the first heating pad 10A. The second direction L2 is a lateral direction of the first heating pad 10A. The modular food warming pad set in this way enables the user to expand the usable area of the warming pad according to needs. Expanding the usable area of the warming pad in the lateral direction makes the expansion of the modular food warming pad more flexible.

In some embodiments, the modular food warming pad is assembled along a second direction L2, the plurality of second heating pads 10B include at least a third connector 109. The adjacent two second heating pads 10B are electrically assembled through the two adjacent third connectors 109. The second heating pad 10B and the first heating pad 10A are electrically assembled through the third connector 109 and the first connector 104.

In some embodiments, the connection terminal of the first connector 104 and the connection terminal on the third connector 109 both include: a second female terminal 3 and a second male terminal 4 adapted to the second female terminal 3. No connection terminal is provided on the second connector 108. The first heating pad 10A and the second heating pad 10B and the adjacent second heating pads 10B are electrically assembled by plugging the second female terminal 3 and the second male terminal 4.

Figure 29:
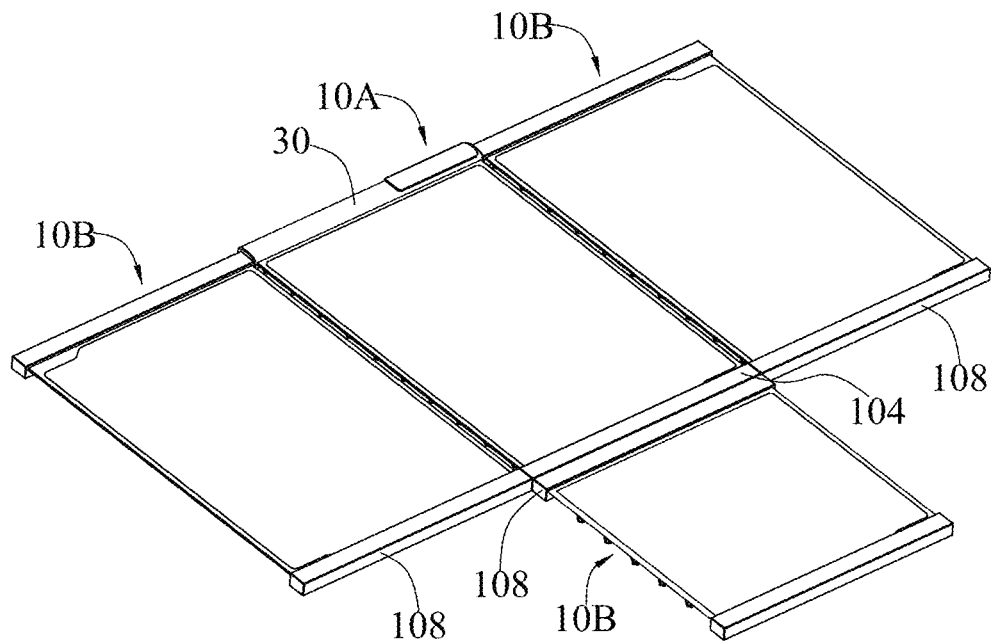
FIG. 29 is another perspective view of a first heating pad and a second heating pad being assembled in accordance with the embodiments of the present disclosure.

As illustrated in FIG. 29, in some embodiments, the modular food warming pad includes: a first heating pad 10A and a second heating pad 10B, and the second heating pad 10B and the first heating pad 10A are electrically assembled. There is multiple second heating pads 10B, and the multiple second heating pads 10B are connected to the second connector 108 through the first connectors 104, so that the multiple second heating pads 10B are electrically assembled with the first heating pad 10A.

In some embodiments, the first heating pad 10A is rectangular parallelepiped, which has four sides, one of which needs to be connected to the controller 30. Therefore, the maximum number of second heating pads 10B connected to the first heating pad 10A is 3. That is to say, to ensure that the controller 30 is connected to the first heating pad 10A, the maximum number of the second heating pads 10B is 1 less than the maximum number of sides of the first heating pad 10A.

Figure 30:
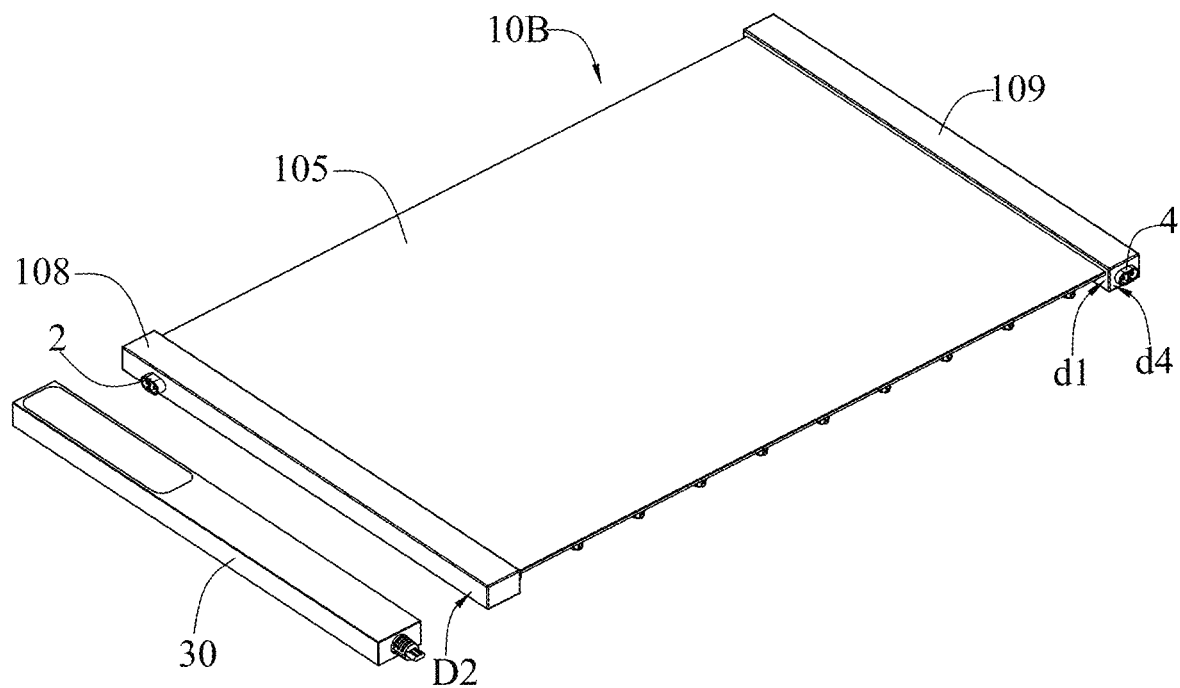
FIG. 30 is a perspective view of a second heating pad and a controller in accordance with the embodiments of the present disclosure.
Figure 31:
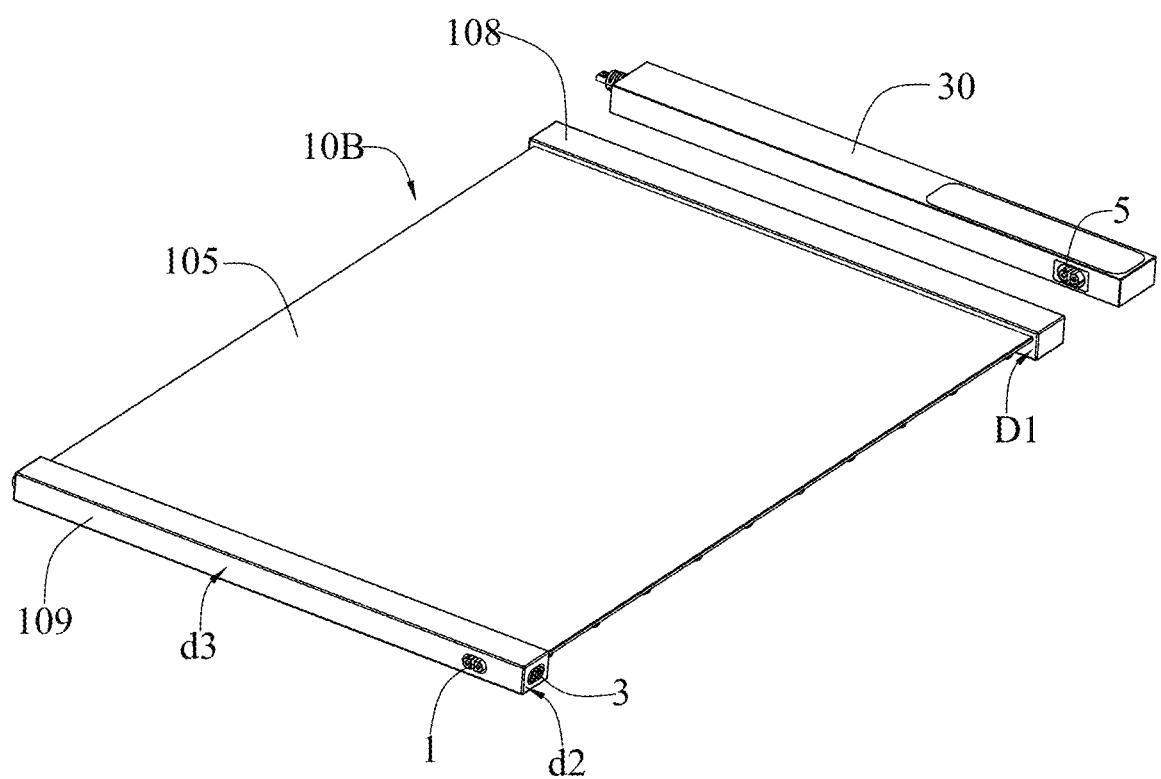
FIG. 31 is another perspective view of a second heating pad and a controller in accordance with the embodiments of the present disclosure.
Figure 32:
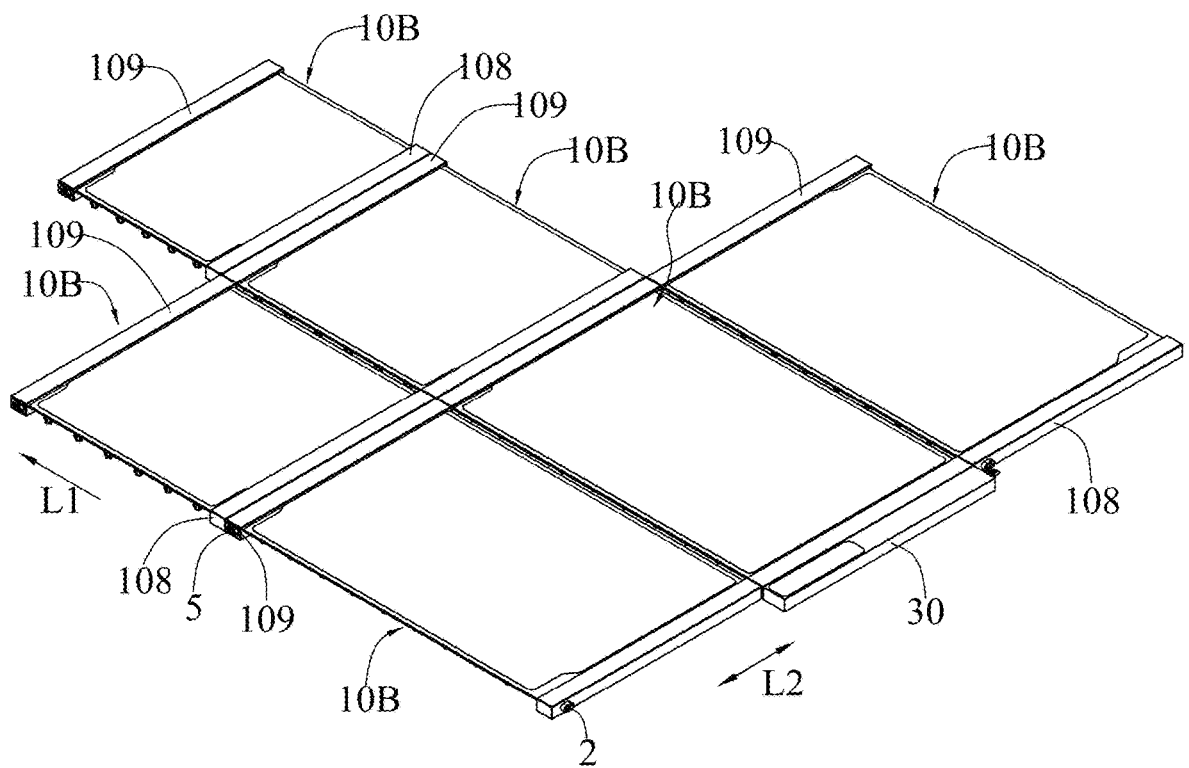
FIG. 32 is a perspective view of a first heating pad and a second heating pad being assembled along a first direction and a second direction in accordance with the embodiments of the present disclosure.

As illustrated in FIG. 30 to FIG. 32, in some embodiments, the modular food warming pad is only provided with the second heating pad 10B. In some embodiments, the modular food warming pad includes: a plurality of second heating pads 10B and a controller 30. The plurality of second heating pads 10B are assembled with each other and electrically connected. The controller 30 is detachably connected to one of the second heating pads 10B, and is electrically connected when the controller 30 is connected to the second heating pad 10B.

In some embodiments, connection terminals are provided on the second connector 108 and the third connector 109. The connection terminal on the second connector 108 includes a first male terminal 2. The connection terminal on the third connector 109 includes a first female terminal 1, a second female terminal 3 and a second male terminal 4. In the second heating pad 10B, the first male terminal 2, the first female terminal 1, the second female terminal 3 and the second male terminal 4 are all electrically connected.

The first female terminal 1 and the first male terminal 2 are mutually configured so that two adjacent second heating pads 10B are assembled along the first direction L1 and be electrically connected; the second female terminal 3 and the second male terminal 4 are mutually configured so that two adjacent second heating pads 10B are assembled along the second direction L2 and be electrically connected.

In some embodiments, the second connector 108 includes: a first side D1 and a second side D2. The first side D1 is connected to the first end of the second support panel 105. A first male terminal 2 is provided on the second side D2. The third connector 109 includes: a third side d1, a fourth side d2, a fifth side d3 and a sixth side d4. The fifth side d1 is connected to the second end of the second support panel 105, the first end is arranged opposite to the second end, so that the first connector 108 and the second connector 109 are respectively located at the opposite ends of the second support panel 105, allowing the second support panel 105 to be assembled. A second female terminal 3 is arranged on the sixth side d2, and a first female terminal 1 is arranged on the seventh side d3. A second male terminal 4 is arranged on the eighth side d4. A third female terminal 5 is arranged on the side wall of the controller 30, and the third female terminal 5 of the controller 30 may be adapted to the first male terminal 2, so that it may be plugged into the second connector 108 and be electrically connected. In some embodiments, the third female terminal 5 of the controller 30 may be adapted to the second male terminal 4, so that it may be plugged into the third connector 109 and be electrically connected.

The modular food warming pad may be assembled and extended in the first direction L1 and in the second direction L2, which greatly improves the adaptability of the warming pad, and a user may flexibly adjust the extension direction of the modular food warming pad according to the actual dining situation, such as the number of meals and the shape of the dining table.

From the above description, it may be seen that the above-mentioned embodiments of the present application achieve the following technical effects.

1) Both the heating pad 10 and the heating wire 20 are made of flexible materials, indicating that the warming pad may be rolled up for storage. The heating wire 20 is encapsulated with adhesive within the positioning groove 11, ensuring the warming pad functions properly even after repeated rolling and unrolling. This design significantly improves storage convenience while guaranteeing the product's service life.

2) The clamping structure within the positioning groove 11 effectively ensures the fixed positioning of the heating wire 20 within the positioning groove 11 during normal use as well as during the winding and storage process, thereby ensuring the proper functioning of the product. Additionally, the design of the positioning groove 11 effectively enhances that the heating wire to be evenly distributed across the area of the heating pad 10, resulting in uniform heating performance of the heating pad 10. This significantly enhances the insulation area of the warming pad and improves the utilization rate of the warming pad.

3) The first heating pad 10A and the second heating pad 10B are connected using a splicing method, ensuring robust electrical connection between them. This modular design of the warming pad not only allows for adjustments in the usable area based on different scenarios such as the quantity of dishes, enhancing the versatility and adaptability of the warming pad, but also facilitates quick assembly and disassembly, and transportation.

4) The design of the wire groove facilitates the assembly of the first wire 103 and the second wire 107, thereby simplifying the manufacturing of the warming pad.

5) The height range of the first raised structure 40A and the second raised structure 40B is between 10 to 20 millimeters. The height of the raised structures being within this range not only creates a gap between the heating area and the load-bearing surface, preventing high temperatures from burning the load-bearing surface. In addition, this gap facilitates the folding flexibility and preventing damage to the heating wire due to curling or folding.

6) A third tongue 63 is set on one side of the first housing 60, near the assembly opening a (b/c), creating a third accommodation port 64 between the third tongue 63 and the side wall of the first housing 60. A mounting strip 73 is protruding from the side surface of the second housing 70, located on the side facing the first housing 60, and the mounting strip 73 is positioned on the side wall of the second housing 70 where the assembly opening a (b/c) is located. When the first housing 60 and the second housing 70 are assembled, the mounting strip 73 fits into the third accommodation port 64. This design enhances the support strength at the connection between the first housing 60 and the second housing 70, thereby preventing the housing from deforming.

The above description is only some embodiments of the present disclosure and is not intended to limit the scope of the present disclosure. Any equivalent changes or modifications made according to the structure, characteristics and principles described in the protection scope of the present disclosure should be included in the protection scope of the present disclosure.

What is claimed is:

1. A modular food warming pad, comprising:
   a first heating pad, and
   a plurality of second heating pads electrically connected to each other;
   wherein the first heating pad comprises:
   a first support panel having an assembly end and a connection end, a first heating source and a first wire being provided on the first support panel;
   a controller connected to the assembly end, the first heating source and a first end of the first wire being electrically connected to the controller; and
   a first connector connected to the connection end, a second end of the first wire being electrically connected to the first connector;
   wherein each of the plurality of second heating pads comprises:
   a second support panel arranged with a second heating source and a second wire;
   a second connector connected to the second support panel, a first end of the second connector being electrically connected to the second heating source and a first end of the second wire; and
   a third connector connected to the second support panel, a first end of the third connector being electrically connected to a second end of the second wire; and
   wherein the first heating pad and the plurality of second heating pads are arranged in a first direction; the first connector of the first heating pad is electrically connected to the second connector of an adjacent second heating pad of the plurality of second heating pads; the third connector of one second heating pad of the plurality of second heating pads is electrically connected to the second connector of another adjacent second heating pad of the plurality of second heating pads;
   each of the first connector, the second connector, and the third connector comprises a housing;
   a first side surface of the first support panel and the second support panel of each of the plurality of second heating pads is provided with a first strip; a second side surface of the first support panel and the second support panel of each of the plurality of second heating pads is provided with a second strip;
   the housing of each of the first connector, the second connector, and the third connector comprises a first housing and a second housing connected to each other; the first housing is provided with a first tongue extending toward the second housing, and the first tongue and an inner wall of the first housing define a first accommodation port for receiving the first strip; the second housing is provided with a second tongue extending toward the first housing, and the second tongue and an inner wall of the second housing define a second accommodation port for receiving the second strip.

2. The modular food warming pad according to claim 1, wherein each of the first heating source and the second heating source is a heating wire, the first side surface and the second side surface of the first support panel and the second support panel of each of the plurality of second heating pads each defines a positioning groove.

3. The modular food warming pad according to claim 2, wherein the positioning groove is evenly distributed on the second side surface, an inner side wall of the positioning groove is provided with a positioning structure configured to limit the heating wire.

4. The modular food warming pad according to claim 3, wherein the positioning structure is a clamp protruding from the inner side wall of the positioning groove, and a distance between the clamp and a bottom of the positioning groove is at least equal to a diameter of the heating wire.

5. The modular food warming pad according to claim 3, wherein the second side surface of the first heating pad and each of the plurality of second heating pads is provided with a wire groove for threading the first wire or the second wire.

6. The modular food warming pad according to claim 5, wherein an inner side wall of the wire groove is provided with a positioning part spaced from a bottom of the wire groove by a distance at least equal to a diameter of the first wire or the second wire.

7. The modular food warming pad according to claim 2, wherein the second side surface of the first heating pad and each of the plurality of second heating pads is further evenly distributed with a plurality of raised structures with equal heights.

8. The modular food warming pad according to claim 7, wherein a height range of the plurality of raised structures is 10 to 20 mm.

9. The modular food warming pad according to claim 5, wherein the positioning groove of the first heating pad and each second heating pad of the plurality of second heating pads comprises an adhesive configured to encapsulate the heating wire; the wire groove of the first heating pad and each second heating pad of the plurality of second heating pads comprises another adhesive configured to encapsulate the first wire or the second wire.

10. The modular food warming pad according to claim 1, wherein the first support panel of the first heating pad and the second support panel of each of the plurality of second heating pads are both flexible.

11. The modular food warming pad according to claim 1, wherein the housing has a mounting cavity, the mounting cavity defines an assembly opening running through a side wall of the housing; and
   each of the first connector, the second connector, and the third connector further comprises a connection terminal having a first end extending into the mounting cavity and a second end fixedly installed at the assembly opening.

12. The modular food warming pad according to claim 11, wherein the first housing and the second housing are surrounded to form the mounting cavity.

13. The modular food warming pad according to claim 12, wherein a third tongue is provided on the first housing, the third tongue and another inner wall of the first housing define a third accommodation port for receiving a mounting strip arranged on a side surface of the second housing.

14. The modular food warming pad according to claim 11, wherein the connection terminal of each of the first connector, the second connector, and the third connector comprises a first male terminal and a first female terminal matched with each other; the first heating pad and an adjacent second heating pad of the plurality of second heating pads is electrically assembled by means of the first connector of the first heating pad and the second connector of the adjacent second heating pad; two adjacent second heating pads of the plurality of second heating pads are electrically assembled by means of the second connector of one of the two adjacent second heating pads and the third connector of another one of the two adjacent second heating pads.

15. The modular food warming pad according to claim 12, wherein a first connection portion is provided on the first connector, a second connection portion is provided on the second connector, and a third connection portion is provided on the third connector, and the second connection portion is matched with both the first connection portion and the third connection portion.

16. A modular food warming pad,
comprising:
a first heating pad, and
a plurality of second heating pads electrically connected to each other;
wherein the first heating pad comprises:
a first support panel having an assembly end and a connection end, a first heating source and a first wire being provided on the first support panel;
a controller connected to the assembly end, the first heating source and a first end of the first wire being electrically connected to the controller; and
a first connector connected to the connection end, a second end of the first wire being electrically connected to the first connector;
wherein each of the plurality of second heating pads comprises:
a second support panel arranged with a second heating source and a second wire;
a second connector connected to the second support panel, a first end of the second connector being electrically connected to the second heating source and a first end of the second wire; and
a third connector connected to the second support panel, a first end of the third connector being electrically connected to a second end of the second wire; and
wherein the first heating pad and the plurality of second heating pads are arranged in a first direction; the first connector of the first heating pad is electrically connected to the second connector of an adjacent second heating pad of the plurality of second heating pads; the third connector of one second heating pad of the plurality of second heating pads is electrically connected to the second connector of another adjacent second heating pad of the plurality of second heating pads;
each of the first connector, the second connector, and the third connector comprises a connection terminal;
wherein the connection terminal of each of the first connector, the second connector, and the third connector comprises a first male terminal and a first female terminal matched with each other; the first heating pad and an adjacent second heating pad of the plurality of second heating pads is electrically assembled by means of the first connector of the first heating pad and the second connector of the adjacent second heating pad; two adjacent second heating pads of the plurality of second heating pads are electrically assembled by means of the second connector of one of the two adjacent second heating pads and the third connector of another one of the two adjacent second heating pads.

* * * * *